United States Patent
Ramachandra et al.

(10) Patent No.: US 10,945,148 B2
(45) Date of Patent: Mar. 9, 2021

(54) WIRELESS DEVICE, NETWORK NODE, AND METHODS PERFORMED THEREBY FOR HANDLING MEASUREMENTS ON A SET OF CELLS

(71) Applicant: Telefonaktiebolaget LM Ericsson (publ), Stockholm (SE)

(72) Inventors: Pradeepa Ramachandra, Linköping (SE); Icaro L. J. da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/078,954

(22) PCT Filed: Aug. 8, 2018

(86) PCT No.: PCT/SE2018/050799
§ 371 (c)(1),
(2) Date: Aug. 22, 2018

(87) PCT Pub. No.: WO2019/032023
PCT Pub. Date: Feb. 14, 2019

(65) Prior Publication Data
US 2020/0120523 A1    Apr. 16, 2020

Related U.S. Application Data

(60) Provisional application No. 62/544,379, filed on Aug. 11, 2017.

(51) Int. Cl.
*H04W 24/10* (2009.01)
(52) U.S. Cl.
CPC .................. *H04W 24/10* (2013.01)
(58) Field of Classification Search
CPC ..................................................... H04W 24/10
See application file for complete search history.

(56) References Cited

U.S. PATENT DOCUMENTS

| 2016/0037425 A1 | 2/2016 | Van Lieshout et al. |
| 2016/0183154 A1* | 6/2016 | Van Der Velde .......... H04W 36/0083 |
| | | 370/331 |

(Continued)

FOREIGN PATENT DOCUMENTS

RU    2623736 C2    6/2017

OTHER PUBLICATIONS

Unknown, Author, "Measurement events in NR", Ericsson, 3GPP TSG-RAN WG2 #98-AdHoc, Tdoc R2-1706948, Qingdao, China, Jun. 27-29, 2017, 1-4.

(Continued)

*Primary Examiner* — Brian D Nguyen
(74) *Attorney, Agent, or Firm* — Murphy, Bilak & Homiller, PLLC

(57) ABSTRACT

A method for handling measurements by a wireless device (130) on a set of serving cells comprising a first cell (121). The wireless device (130) determines (202) one or more types of signals to perform measurements on for each cell in the set. The determination is based on an obtained configuration, per configured event, of one or more events, each setting a condition to trigger a measurement report. At least one of the events is configured in at least one reportConfig linked to a measurement object whose RS Type within the reportConfig is set to one type of signal. The wireless device (130) determines to perform the measurements on the one type of signal that is set. The wireless device (130) then initiates (203) sending an indication to a network node (110) serving the wireless device (130). The indication is based on the measurements on the determined one or more types of signals.

27 Claims, 8 Drawing Sheets

(56) References Cited

U.S. PATENT DOCUMENTS

| | | | | |
|---|---|---|---|---|
| 2017/0064576 A1* | 3/2017 | Kusashima | ............ | H04L 5/005 |
| 2017/0086087 A1* | 3/2017 | Kim | ...................... | H04W 24/10 |
| 2018/0323848 A1* | 11/2018 | Mizusawa | ................ | H04B 7/04 |
| 2018/0352459 A1* | 12/2018 | Ku | ......................... | H04W 24/10 |
| 2019/0058513 A1* | 2/2019 | Mizusawa | ............... | H04L 27/26 |
| 2020/0084809 A1* | 3/2020 | Park | ..................... | H04W 76/10 |

OTHER PUBLICATIONS

Unknown, Author, "NR measurement results in LTE measurement report", Intel Corporation, 3GPP TSG-RAN WG2 NR Ad hoc 1801, R2-1800935, Vancouver, Canada, Jan. 22-26, 2017, 1-5.

Unknown, Author, "Measurement configuration and procedures for SS and CSI-RS", 3GPP TSG-RAN WG2 NR Ad-Hoc, R2-1706730, Qingdao, China, Jun. 27-29, 2017, pp. 1-6.

Unknown, Author, "Remaining open issues on measurement reporting in NR", 3GPP TSG-RAN WG2 #Ad Hoc Tdoc R2-1707286, Qingdao, China, Jun. 27-29, 2017, 1-8.

* cited by examiner a)

b)

a)

b)

a)

b)

a)

b)

WIRELESS DEVICE, NETWORK NODE, AND METHODS PERFORMED THEREBY FOR HANDLING MEASUREMENTS ON A SET OF CELLS

TECHNICAL FIELD

The present disclosure relates generally to a wireless device and methods performed thereby for handling measurements by the wireless device on a set of cells. The present disclosure further relates generally to a network node, and methods performed thereby for handling the measurements by the wireless device on the set of cells.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, such as radio network nodes, e.g., Transmission Points (TP). The wireless communications network covers a geographical area which may be divided into cell areas, each cell area being served by a network node such as a Base Station (BS), e.g., a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

In a wireless communications system, such as a cellular network, a wireless device, e.g., a wireless device, may be monitoring the surrounding radio environment, by performing measurements of signals from different cells, e.g., by monitoring different signal strengths from different cells, which may be from different radio base stations or from different cells served by the same base station. The stronger the signal strength from the cell is, the more suitable is the cell to camp on. By frequently monitoring the surrounding radio environment, the wireless device may be ensured to be camping on the cell serving the wireless device with the strongest signal strength, or at least one of the stronger cells, given its current position.

In LTE, a measurement configuration, MeasConfig, may be provided to the UE that may be understood to provide the necessary information to the UE for performing measurements. The MeasConfig provided to the UE may inform the UE of, amongst other things, the measurement objects, reporting configuration, and quantity configuration. The measurement object may be understood to refer to a frequency or carrier that is to be measured and the relevant information that may be required for performing measurements in that frequency or carrier, for example, which cells to be measured in the said frequency, which cells are not to be measured in the said frequency, what is the cell individual offset to be used, etc. The reporting configuration may be understood to define to a condition to be met for the measurement result to be reported, and the quantity configuration may be understood to refer to how to filter the measurement quantities, e.g., Reference Signal Received Power (RSRP), Reference Signal Received Quality (RSRQ), Signal to Interference plus Noise Ratio (SINR), specific filtering coefficients, etc. . . . . .

The MeasConfig in LTE RRC, according to 3GPP spec. 36.331 is as follows:

```
------ Begin MeasConfig ------
-- ASN1START
MeasConfig ::=                              SEQUENCE {
    -- Measurement objects
    measObjectToRemoveList                      MeasObjectToRemoveList
                                                            OPTIONAL,  -- Need ON
    measObjectToAddModList                      MeasObjectToAddModList
                                                            OPTIONAL,  -- Need ON
    -- Reporting configurations
    reportConfigToRemoveList                    ReportConfigToRemoveList
                                                            OPTIONAL,  -- Need ON
    reportConfigToAddModList                    ReportConfigToAddModList
        OPTIONAL, -- Need ON
    -- Measurement identities
    measIdToRemoveList                          MeasIdToRemoveList
        OPTIONAL, -- Need ON
```

```
        measIdToAddModList                              MeasIdToAddModList
                                                                            OPTIONAL,  -- Need ON
    -- Other parameters
        quantityConfig                                  QuantityConfig
                                                                            OPTIONAL,  -- Need ON
        measGapConfig                                   MeasGapConfig
                                                                            OPTIONAL,  -- Need ON
        s-Measure                                       RSRP-Range
                                                                            OPTIONAL,  -- Need ON
        preRegistrationInfoHRPD                         PreRegistrationInfoHRPD
                                                                            OPTIONAL,  -- Need OP
        speedStatePars                          CHOICE {
            release                                     NULL,
            setup                                       SEQUENCE {
                mobilityStateParameters                     MobilityStateParameters,
                timeToTrigger-SF                            SpeedStateScaleFactors }
        }                                                                   OPTIONAL,  -- Need ON
    ...,
    [[      measObjectToAddModList-v9e0                         MeasObjectToAddModList-v9e0
                                                                            OPTIONAL -- Need ON ]],
    [[      allowInterruptions-r11                              BOOLEAN
                                                                            OPTIONAL -- Need ON ]],
    [[      measScaleFactor-r12                         CHOICE {
                release                                 NULL,
                setup                                   MeasScaleFactor-r12
            }
                                                                            OPTIONAL,  -- Need ON
            measIdToRemoveListExt-r12                   MeasIdToRemoveListExt-r12
                                                                            OPTIONAL,  -- Need ON
            measIdToAddModListExt-r12                   MeasIdToAddModListExt-r12
                                                                            OPTIONAL,  -- Need ON
            measRSRQ-OnAllSymbols-r12                   BOOLEAN
                                                                            OPTIONAL -- Need ON
    ]],
    [[
            measObjectToRemoveListExt-r13                       MeasObjectToRemoveListExt-r13
                                                                            OPTIONAL,  -- Need ON
            measObjectToAddModListExt-r13                       MeasObjectToAddModListExt-r13
                                                                            OPTIONAL,  -- Need ON
            measIdToAddModList-v1310                    MeasIdToAddModList-v1310
    OPTIONAL, -- Need ON
            measIdToAddModListExt-v1310                         MeasIdToAddModListExt-v1310
                                                                            OPTIONAL -- Need ON ]],
    [[      measGapConfigPerCC-List-r14                 MeasGapConfigPerCC-List-r14
                                                                            OPTIONAL,  -- Need ON
            measGapSharingConfig-r14                    MeasGapSharingConfig-r14
                                                                            OPTIONAL -- Need ON
    ]]
    }
    MeasIdToRemoveList ::=                              SEQUENCE (SIZE (1..maxMeasId)) OF MeasId
    MeasIdToRemoveListExt-r12 ::=                       SEQUENCE (SIZE (1..maxMeasId))
                                                                OF MeasId-v1250
    MeasObjectToRemoveList ::=                          SEQUENCE (SIZE (1..maxObjectId))
                                                                OF MeasObjectId
    MeasObjectToRemoveListExt-r13 ::=                   SEQUENCE (SIZE (1..maxObjectId))
                                                                OF MeasObjectId-v1310
    ReportConfigToRemoveList ::=                        SEQUENCE (SIZE (1..maxReportConfigId)) '
                                                                OF ReportConfigId
    -- ASN1STOP
                                            ------      End MeasConfig ------
```

The UE may be configured with multiple measurement objects, wherein each may correspond to the carrier associated with that measurement object. In the Carrier Aggregation (CA) or Dual Connectivity (DC) case, the UE may be configured with one PCell and possibly one or more SCells. The UE may be required to perform the measurements in these corresponding frequencies.

In LTE, only one Reference Signal (RS) type may be used to derive cell quality or cell measurement results. Hence, upon receiving a measurement configuration, the UE may be required to perform cell measurement results for the PCell and the configured SCells based on the cell-specific RS in those configured frequencies. Therefore, for all these serving cells, the UE may use the same RS type, namely the cell-specific RS.

NR Architecture

The so-called 5G system, from a radio perspective started to be standardized in 3GPP and the so-called New Radio (NR) is the name for the radio interface. One of the characteristics of NR is the frequency range going to higher frequencies than LTE, e.g., above 6 GHz, where it is known to have more challenging propagation conditions such as a higher penetration loss. To mitigate some of these effects, multi-antenna technologies such as beamforming may be massively used. Yet another NR characteristic is the possibility to enable shorter latencies.

NR architecture is being discussed in 3GPP, where gNB denotes a NR BS. One NR BS may correspond to one or more transmission/reception points. Both standalone and non-standalone NR deployments will be standardized in 3GPP. The standalone deployments may be single or multi-carrier, e.g., NR CA or dual connectivity with NR PCell and NR PSCell. The non-standalone deployments are currently meant to describe a deployment with LTE PCell and NR PSCell. There may also be one or more LTE SCells and one or more NR SCell.

Currently, there are no existing configurations on how to perform serving cell related measurements in NR.

SUMMARY

It is an object of embodiments herein to enable the handling of cell measurements by a wireless device in NR.

According to a first aspect of embodiments herein, the object is achieved by a method, performed by a wireless device. The method is for handling measurements by the wireless device on a set of cells comprising at least a first cell. The cells in the set are serving cells. The wireless device operates in a wireless communications network. The wireless device determines one or more types of signals to perform measurements on for each cell in the set of cells. The determination is based on an obtained configuration, per configured event, of one or more events. Each of the one or more events sets a condition to trigger a measurement report. At least one of the one or more events is configured in at least one reportConfig. The reportConfig is linked to a measurement object whose Reference Signal (RS) Type within the reportConfig is set to one type of signal of the one or more types of signals. The wireless device determines to perform the measurements on at least the one type of signal that is set. The wireless device then initiates sending an indication to a network node serving the wireless device. The indication is based on the measurements by the wireless device on the determined one or more types of signals.

According to a second aspect of embodiments herein, the object is achieved by a method, performed by the network node. The method is for handling the measurements by the wireless device on the set of cells comprising at least the first cell. The cells in the set are serving cells. The network node and the wireless device operate in the wireless communications network. The network node provides the first indication to the wireless device. The first indication comprises the configuration, per configured event, of the one or more events. Each of the one or more events sets a condition to trigger a measurement report. At least one of the one or more events is configured in at least one reportConfig. The reportConfig is linked to the measurement object whose RS Type within the reportConfig is set to one type of signal of one or more types of signals to perform measurements on. The network node then obtains, based on the provided first indication, the second indication from the wireless device. The second indication is based on the measurements, by the wireless device, on the at least the one type of signal that is set within the reportConfig.

According to a third aspect of embodiments herein, the object is achieved by the wireless device, configured to handle measurements by the wireless device on the set of cells configured to comprise at least the first cell. The cells in the set are configured to be serving cells. The wireless device is configured to operate in the wireless communications network. The wireless device is further configured to determine the one or more types of signals to perform measurements on for each cell in the set of cells. To determine is configured to be based on the configuration configured to be obtained, per configured event, of the one or more events. Each of the one or more events is configured to set a condition to trigger a measurement report. At least one of the one or more events is configured in at least one reportConfig. The reportConfig is configured to be linked to the measurement object whose RS Type within the reportConfig is configured to be set to one type of signal of the one or more types of signals. The wireless device is configured to determine to perform the measurements on at least the one type of signal that is configured to be set. The wireless device is further configured to initiate sending the indication to the network node configured to serve the wireless device. The indication is configured to be based on the measurements by the wireless device on the one or more types of signals configured to be determined.

According to a fourth aspect of embodiments herein, the object is achieved by the network node, configured to handle the measurements by the wireless device on the set of cells configured to comprise at least the first cell. The cells in the set are configured to be serving cells. The network node and the wireless device are configured to operate in the wireless communications network. The network node is further configured to provide the first indication to the wireless device. The first indication is configured to comprise the configuration, per configured event, of the one or more events. Each of the one or more events is configured to set a condition to trigger a measurement report. At least one of the one or more events is configured in at least one reportConfig. The reportConfig is configured to be linked to the measurement object whose RS Type within the reportConfig is configured to be set to one type of signal of one or more types of signals to perform measurements on. The network node is also configured to obtain, based on the first indication configured to be provided, the second indication from the wireless device. The second indication is configured to be based on the measurements, by the wireless device, on the at least the one type of signal that is configured to be set within the reportConfig.

By the wireless device determining the one or more types of signals to perform measurements on for each of the cells in the set of cells, being based on the obtained configuration per configured event, an already existing RS Type may be used by the network node to indicate which RS Type may be used to perform serving cell measurements. Therefore, the configuration, when more than one RS may be used is enabled. Furthermore, the configuration procedure is simplified, saving processing, energy, and radio resources for both, the network node and the wireless device.

Furthermore, the measurement report may contain the quality of the cells in the set of cells, e.g., SCells, based on different types of signals, e.g., RS signals. By then initiating sending the indication to the network node, the network may be enabled to evaluate the quality of the cells based on both different signals, before, e.g., establishing a dual connectivity or carrier aggregation. This may be particularly useful when, for example, the different types of signals may be beamformed signals, and they may be beamformed differently. One of the types of signals may be coverage oriented, e.g., more wide beams with uniform coverage, and another type of signal may be capacity oriented, e.g., more narrow beams but with spotty coverage. If the network node obtains the SCell quality based on both these types of signals, it may be enabled to better judge whether a particular cell, e.g., a SCell, may be suitable for the wireless device or not.

BRIEF DESCRIPTION OF THE DRAWINGS

Examples of embodiments herein are described in more detail with reference to the accompanying drawings, and according to the following description.

DETAILED DESCRIPTION

Figure 1:
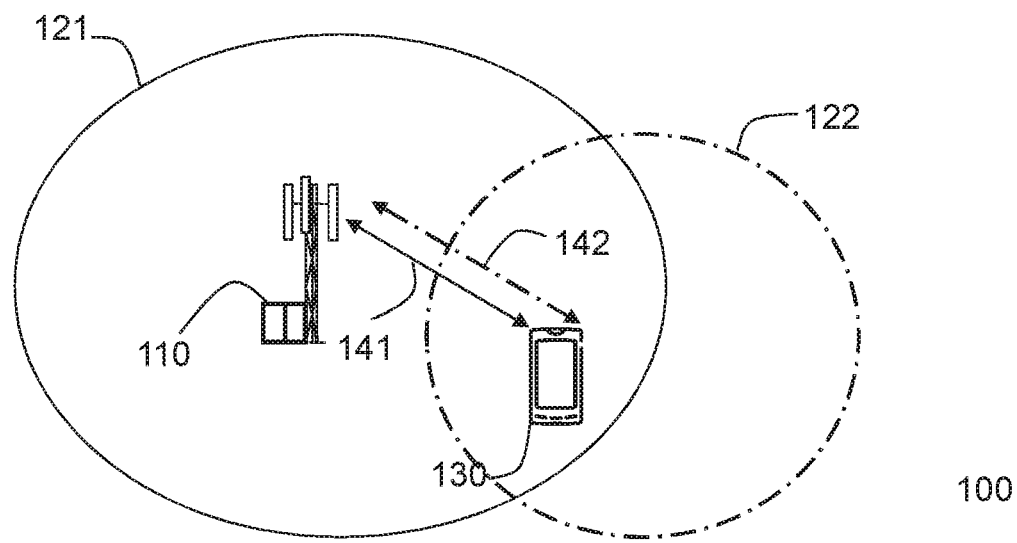
FIG. 1 is a schematic diagram illustrating a wireless communications network, according to embodiments herein.
Figure 1:
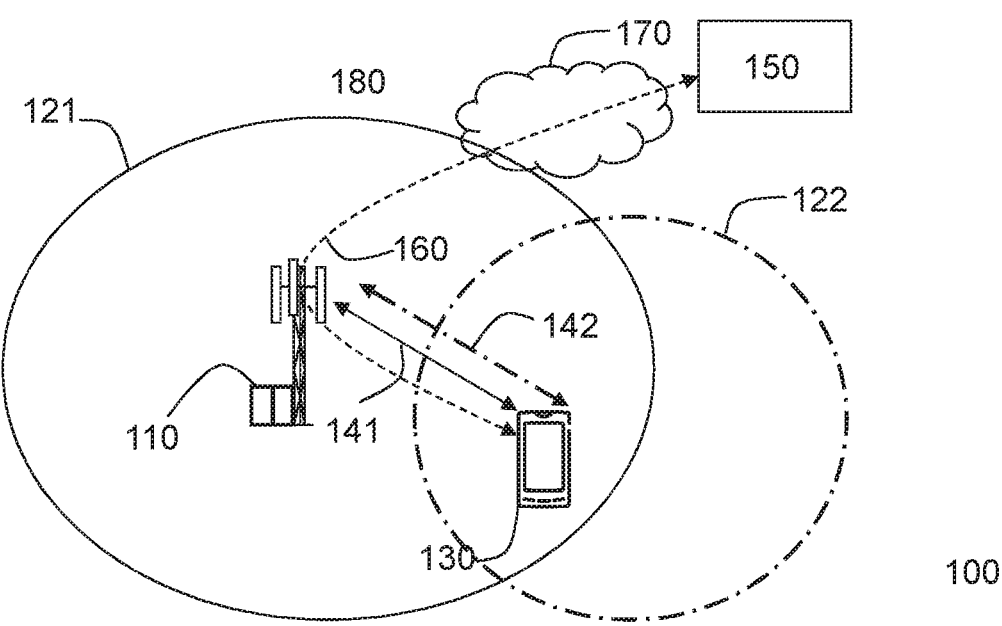

As part of the development of embodiments herein, one or more problems with the existing technology will first be identified and discussed.

In NR, the cell measurement results, e.g., Reference Signal Received Power (RSRP), Reference Signal Received Quality (RSRQ), Signal to Interference plus Noise Ratio (SINR), may be computed based on different RS Types, e.g., NR Synchronization Signal (NR-SS) or Channel State Information RS (CSI-RS), where the measurement quantities to be included may be configured per reportConfig.

| Agreements from RAN2#97 meeting |
| --- |
| 1    An RRC_CONNECTED UE should be able to perform Radio Resource Management (RRM) measurements on always on IDLE RS, e.g., synchronization signal. |
| 2    An RRC_CONNECTED UEs should be able to perform RRM measurements on additional RS, e.g., CSI-RS, Mobility Reference Signal (MRS), etc.. |

It has also been agreed that the PCell and SCell measurements may always be included in the measurement report.

| Agreements from RAN2#98AH meeting |
| --- |
| 5: For event triggered reporting:<br>• PCell and SCells cell quality are always included in the measurement report |

The PCell and SCells may be transmitting both NR-SS and CSI-RS. In such a scenario, although it has been agreed that the UE may perform serving cell measurements and report different measurement quantities as configured in reportConfig, it has not been discussed in 3GPP how to configure the RS, or the UE, to perform serving cell related measurements, e.g., PCell and SCells.

In order to address these problems, several embodiments are comprised herein. As a summarized overview, embodiments herein may be understood to relate to configuration of measurement of a serving cells in NR. Particular examples of embodiments herein may be understood to relate to a method where the network may configure the UE to perform cell level measurements associated with the PCell and the configured SCell(s), e.g., in the case of carrier aggregation, based on the same or different reference signal types (RS types).

The RS types may be a RS in the SS Block, such as NR-PSS, and/or NR-Secondary Synchronization Signal (SSS), and/or Physical Broadcast CHannel (PBCH) DeModulation Reference Signal (DRMS) or the CSI-RS(s).

In an alternative approach, the UE may perform cell level measurements related to all configured RSs per SCell and PCell.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 5G NR has been used in this disclosure to exemplify the embodiments herein, this should not be seen as limiting the scope of the embodiments herein to only the aforementioned system. Other wireless systems with similar features, may also benefit from exploiting the ideas covered within this disclosure.

FIG. 1 depicts two non-limiting examples, in FIGS. 1a, and 1b respectively, of a wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may also support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR may be used in this disclosure to exemplify embodiments herein, this should not be seen as limiting the scope of the embodiments herein to only the aforementioned system. The wireless communications network may also be understood as a non-cellular system, comprising network nodes which may serve receiving nodes, such as wireless devices, with serving beams. This may be a typical case, e.g., a in a 5G network.

The wireless communications network 100 comprises a plurality of network nodes, whereof a network node 110 is depicted in the non-limiting examples of FIG. 1. In other examples, which are not depicted in FIG. 1, the network node 110 may be a distributed node, such as a virtual node in the cloud, and may perform its functions entirely on the cloud, or partially, in collaboration with a radio network node.

The network node 110 may be a radio network node. That is, a transmission point such as a radio base station, for example a gNB, or any other network node with similar features capable of serving a wireless device, such as a user equipment or a machine type communication device, in the wireless communications network 100.

The wireless communications network 100 covers a geographical area which may be divided into cell areas, wherein each cell area may be served by a network node, although, one radio network node may serve one or several cells. The wireless communications network 100 comprises a set of cells. The set of cells comprises a first cell 121, and may further comprise, in some embodiments, one or more second cells 122. In the non-limiting example depicted in FIG. 1, only one second cell 122 is depicted to simplify the Figure. However, it will be understood that more second cells may be comprised in the one or more second cells 122. The first cell maybe a primary cell (PCell) and each of the one or more second cells 122 may be a secondary cell (SCell). In the non-limiting example depicted in FIG. 1, the network node 110 is a radio network node that serves the first cell 121, and the one or more second cells 122. However, in other examples, any of the one or more second cells 122 may be served by other network nodes in the wireless communications network 100. Even in examples wherein the wireless communications network 100 may not be referred to as a cellular system, if the network node 110 may serve receiving nodes, such as wireless devices, with serving beams, the areas of coverage of the beams may still be referred to as cells. The network node 110 may be of different classes, such as, e.g., macro base station, home base station or pico base station, based on transmission power and thereby also cell size. The network node 110 may support one or several communication technologies, and its name may depend on the technology and terminology used. In 5G/NR, the network node 110 may be referred to as a gNB and may be directly connected to one or more core networks, which are not depicted in FIG. 1.

A plurality of wireless devices are located in the wireless communication network 100, whereof a wireless device 130, is depicted in the non-limiting examples of FIG. 1. The wireless device 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a tablet with wireless capability, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may comprised within the wireless communications network 100.

The wireless device 130 may be configured to communicate within the wireless communications network 100 with the network node 110 in the first cell 121 over a first link 141, e.g., a radio link. The wireless device 130 may be configured to communicate within the wireless communications network 100 with the network node 110 in each of the one or more second cells 122 over a respective second link 142, e.g., a radio link.

In some embodiments, the wireless communications network 100 may be connected to a host computer 150, which is depicted in the example of FIG. 1b. The host computer 150 may be embodied in the hardware and/or software of a standalone server, a cloud-implemented server, a distributed server or as processing resources in a server farm. The host computer 150 may be under the ownership or control of a service provider, or may be operated by the service provider or on behalf of the service provider. The host computer 150 may communicate with the wireless device 130 via a third link 160. The third link 160 may comprise one or more wired and wireless links, and extend via, e.g., the cloud 170, the network node 110, and other network nodes or core network nodes in the wireless communications network. In some examples, the third link 160 may extend via an optional intermediate network, which is not depicted in FIG. 1 to simplify the Figure. The intermediate network may be one of, or a combination of more than one of, a public, private or hosted network; the intermediate network may be a backbone network or the Internet. A connectivity provided by the third link 160 may be referred to as an Over the Top (OTT) connection.

The system comprising the host computer 150, the network node 110 and the wireless device 130 may be referred to herein as a telecommunications system 180.

In general, the usage of "first", "second", "third", "fourth", "fifth" and/or "sixth" herein may be understood to be an arbitrary way to denote different elements or entities, and may be understood to not confer a cumulative or chronological character to the nouns they modify.

Terminology

The term "radio measurement" used herein may refer to any measurement performed on radio signals. Radio measurements may be absolute or relative. Radio measurement may be referred to as a signal level, which may be a signal quality and/or a signal strength. Radio measurements may be e.g., intra-frequency, inter-frequency, inter-RAT measurements, Carrier Aggregation (CA) measurements, etc. Radio measurements may be unidirectional, e.g., DL or UL, or bidirectional, e.g., Round-Trip Time (RTT), Reception-Transmission (Rx-Tx), etc. . . . . Some examples of radio measurements may be timing measurements, such as e.g., Time of Arrival (TOA), timing advance, RTT, Reference Signal Time Difference (RSTD), Rx-Tx, propagation delay, etc., angle measurements, such as e.g., angle of arrival, power-based measurements, such as e.g., received signal power, RSRP, received signal quality, RSRQ, SINR, Signal to Noise Ratio (SNR), interference power, total interference plus noise, Received Signal Strength Indicator (RSSI), noise power, etc., cell detection or cell identification, Radio Link Monitoring (RLM), System Information (SI) reading, etc. The inter-frequency and inter-RAT measurements may be carried out by the UE in measurement gaps unless the UE may be capable of doing such measurement without gaps. Examples of measurement gaps are measurement gap id #0, each gap of 6 ms occurring every 40 ms, measurement gap id #1, each gap of 6 ms occurring every 80 ms, etc. The measurement gaps may be configured at the UE by the network node.

Performing a measurement on a cell may imply performing measurements on signals of the cell. Examples of cell specific measurements may be signal strength, signal quality etc.

Figure 2:
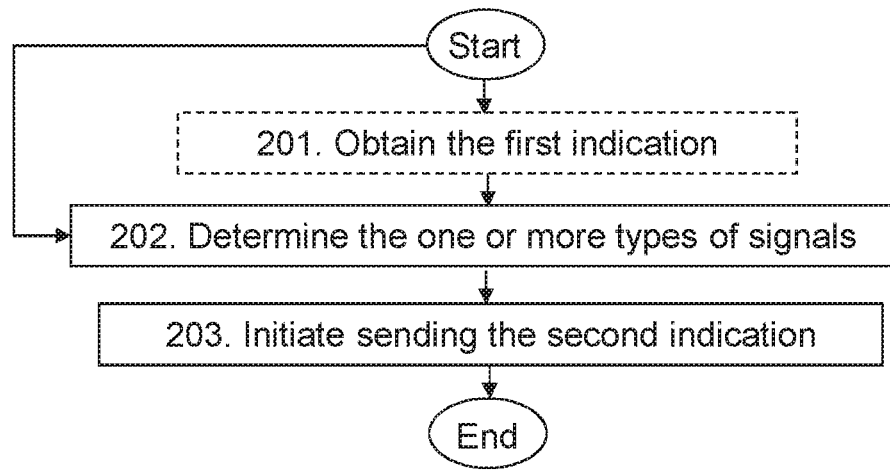
FIG. 2 is a flowchart depicting embodiments of a method in a wireless device, according to embodiments herein.

Embodiments of a method, performed by the wireless device 130, will now be described with reference to the flowchart depicted in FIG. 2. The method is for handling measurements by the wireless device 130 on a set of cells comprising at least the first cell 121. The cells in the set may be understood to be serving cells.

In some embodiments, the set of cells may further comprise one or more second cells 122. In some of these embodiments, the first cell 121 may be a primary cell (PCell) and the one or more second cells 122 may be secondary cells (SCell).

The wireless device 130 operates in the wireless communication network 100.

In some embodiments all the actions may be performed. In some embodiments, an action may be optional. It should be noted that the examples herein are not mutually exclusive. One or more embodiments may be combined, where applicable. Components from one embodiment may be tacitly assumed to be present in another embodiment and it will be obvious to a person skilled in the art how those components may be used in the other exemplary embodiments. All possible combinations are not described to simplify the description. In FIG. 2, an optional actions is indicated with dashed lines. Some actions may be performed in a different order than that shown in FIG. 2.

Action 201

In the course of its operations in the wireless communications network 100, the wireless device 130, may monitor the surrounding radio environment to e.g., make sure it is camping on the cell serving with the strongest signal strength, given its current position. As stated above, in NR, the cell measurement results may be computed based on different RS Types. In NR, it has been agreed that cell measurements results may either be configured by the network to be performed based on SS Block-based reference signal(s) (e.g. NR-SSS) or CSI-RS.

Based on a previous agreement, different events, such as A1, A2, etc. may be configured with different RS Type(s). Hence, for example, some events may be configured based on CSI-RS, while other events may be configured based on SS-Block signal(s). In another example, the same event type, e.g., A1, may be linked to the same measurement object but, thanks to different measurement IDs, one may be configured for SS-based while the other for CSI-RS.

In order to enable the wireless device 130 to determine on which RS, out of the possible RS Types, to perform serving cell related measurements, in this Action 201, the wireless device 130 may obtain a first indication from the network node 110. In some particular examples, the wireless device 130 may be a 5G UE and the network node 110 may be an gNB.

Obtaining may be understood as e.g., receiving. The receiving in this Action 201 may be implemented, e.g., via the first link 141.

The obtained configuration may be obtained, per configured event, of one or more events. Each of the one or more events may be understood to set a condition to trigger a measurement report. The one or more events may be e.g., A1, A2, A3, A4, etc. . . . .

The first indication may comprise a configuration. The first indication may for example be, an information element in MeasConfig.

In some embodiments, the obtained configuration may be a reportConfig.

At least one of the one or more events may be configured in at least one reportConfig linked to a measurement object whose Reference Signal (RS) Type within the reportConfig is set to one type of signal to perform measurements on for each cell in the set of cells.

The type of signal may comprise: an RS in the SS Block, such as NR-PSS and/or NR-SSS and/or PBCH DRMS, or the CSI-RSs.

Action 202

In this Action 202, the wireless device 130, determines one or more types of signals to perform measurements on for each cell in the set of cells. The determination is based on the obtained configuration, per configured event, of the one or more events. That is, the configuration obtained in Action 201. As stated earlier, each of the one or more events sets a condition to trigger a measurement report. At least one of the one or more events is configured in at least one reportConfig linked to a measurement object whose RS Type within the reportConfig is set to one type of signal of the one or more types of signals. The wireless device 130 determines to perform the measurements on at least the one type of signal that is set.

In some embodiments, the obtained configuration may be the reportConfig, which is used for the determination in this Action 202.

The one or more types of signals in the configuration may be understood as a first group of one or more types of signals.

The determined one or more types of signals may be understood as a second group of one or more types of signals.

In some embodiments, the at least one of the one or more events is A1, wherein the event A1 is configured and is linked to the measurement object associated to the first cell 121. In some embodiments, the at least one of the one or more events is A2, wherein the event A2 is configured and is linked to the measurement object associated to the first cell 121.

In some first embodiments, wherein the at least one of the one or more events is one of A1 and A2, one of the following two options may apply.

In a first option, the measurement object is associated to the first cell 121, and is linked to the at least one reportConfig, whose RS Type is set to SS. According to such first option, the wireless device 130 performs first cell 121 measurements based on the SS. That is, the wireless device 130 may determine in this Action 202 to perform the first cell 121 measurements based on the SS.

In a second option, the measurement object is associated to the first cell 121, and is linked to the at least one reportConfig, whose RS Type is set to CSI-RS. According to such second option, the wireless device 130 performs first cell 121 measurements based on the CSI-RS. That is, the wireless device 130 may determine in this Action 202 to perform the first cell 121 measurements based on the CSI-RS.

In some embodiments, wherein the at least one of the one or more events is A3, one of the following two options may apply.

In a first option, the A3 event is configured in the at least one reportConfig linked to the measurement object, whose RS Type is set to SS. According to such first option, and the wireless device 130 performs first cell 121 measurements at least based on the SS. That is, the wireless device 130 may determine in this Action 202 to perform the first cell 121 measurements based on the SS.

In a second option, the A3 event is configured in the at least one reportConfig linked to a measurement object, whose RS Type is set to CSI-RS. According to such second option, the wireless device 130 performs first cell 121 measurements at least based on the CSI-RS. That is, the wireless device 130 may determine in this Action 202 to perform the first cell 121 measurements based on the SS.

In some embodiments, wherein the at least one of the one or more events is A4, at least one of the following four options may apply.

In a first option, the A4 event is configured in the at least one reportConfig linked to the measurement object, whose RS Type is set to SS. According to such first option, the wireless device 130 performs first cell 121 measurements based on SS. That is, the wireless device 130 may determine in this Action 202 to perform the first cell 121 measurements based on the SS.

In a second option, the A4 event is configured in the at least one reportConfig linked to the measurement object, whose RS Type is set to CSI-RS. According to such second option, the wireless device 130 performs first cell 121 measurements based on CSI-RS. That is, the wireless device 130 may determine in this Action 202 to perform the first cell 121 measurements based on the CSI-RS.

In a third option, the A4 event is configured in the at least one reportConfig linked to the measurement object, whose RS Type is set to CSI-RS, wherein the CSI-RS is not configured for the wireless device 130. According to such third option, the wireless device 130 performs first cell 121 measurements based on SS. That is, the wireless device 130 may determine in this Action 202 to perform the first cell 121 measurements based on the SS.

In a fourth option, the A4 event is configured in the at least one reportConfig linked to the measurement object, whose RS Type is set to CSI-RS, wherein the CSI-RS is not configured for the first cell 121. According to such fourth option, the wireless device 130 may notify the network of a failure related to cell level measurements of the first cell 121.

In some embodiments, wherein the at least one of the one or more events is A5, one of the following two options may apply.

In a first option, the A5 event is configured in the at least one reportConfig linked to the measurement object whose RS Type is set to SS. According to such first option, the wireless device 130 performs first cell 121 measurements based on SS. That is, the wireless device 130 may determine in this Action 202 to perform the first cell 121 measurements based on the SS.

In a second option, the A5 event is configured in the at least one reportConfig linked to a measurement object, whose RS Type is set to CSI-RS. According to such second option, the wireless device 130 performs first cell 121 measurements based on CSI-RS. That is, the wireless device 130 may determine in this Action 202 to perform the first cell 121 measurements based on the CSI-RS.

In some embodiments, wherein the at least one of the one or more events is A6, at least one of the following two options may apply.

In a first option, the A6 event is configured in the at least one reportConfig linked to the measurement object, whose RS Type is set to SS. According to such first option, the wireless device 130 performs one or more second cells 122 measurements based on SS at least for the one or more second cells 122 associated to the frequency associated to the measurement object linked to the configured one or more second cells 122. That is, the wireless device 130 may determine in this Action 202 to perform the measurements one the one or more second cells 122 based on the SS.

In a second option, the A6 event is configured in the at least one reportConfig linked to a measurement object whose RS Type is set to CSI-RS. According to such second option, the wireless device 130 performs one or more second cells 122 measurements based on CSI-RS at least for the one or more second cells 122 associated to the frequency associated to the measurement object linked to the configured one or more second cells 122. That is, the wireless device 130 may determine in this Action 202 to perform the measurements one the one or more second cells 122 based on the CSI-RS.

Action 203

Once the wireless device 130 may have performed the measurements according to the determination carried out according to Action 202, in this Action 203, the wireless device 130 initiates sending an indication to the network node 110 serving the wireless device 130. The indication is based on the measurements by the wireless device 130 on the determined one or more types of signals. In some embodiments the indication may be referred to as a second indication.

The indication may be for example comprised in, e.g., measResults.

In some embodiments, the indication may further comprise cell level information, based on the determined one or more types of signals.

It may also be noted that in the above explanation, beam level information inclusion is not discussed. Beam level information may be understood to refer to beam level reporting, such as, e.g., SSB index, SSB-RSRP, SSB-RSRQ, SSB-SINR, CSI-RS index, CSI-RSRP, CSI-RSRQ, or CSI-SINR. However, if the beam level information is configured to be included in the measurement report, e.g., via include BeamReport, the wireless device 130 may include the beam level information based on the rsType of PCell and SCell also in the measurement report. Accordingly, the indication may further comprise beam level information, based on the determined one or more types of signals. This may be based on the obtained configuration.

In some embodiments, the indication may be further based on which event of the at least one of the one or more events may be configured, and what RS Type may be configured.

Embodiments of a method, performed by the network node 110, will now be described with reference to the flowchart depicted in FIG. 3. The method is for handling measurements by the wireless device 130 on the set of cells comprising at least the first cell 121. The cells in the set may be understood to be serving cells.

The wireless device 130 operates in the wireless communication network 100.

In some embodiments all the actions may be performed. In some embodiments, an action may be optional. It should be noted that the examples herein are not mutually exclusive. One or more embodiments may be combined, where applicable. Components from one embodiment may be tacitly assumed to be present in another embodiment and it will be obvious to a person skilled in the art how those components may be used in the other exemplary embodiments. All possible combinations are not described to simplify the description.

The detailed description of some of the following corresponds to the same references provided above, in relation to the actions described for the wireless device 130, and will thus not be repeated here to simplify the description. For example, the information may be positioning information, such as e.g., in some embodiments, the set of cells may further comprise one or more second cells 122. In some of these embodiments, the first cell 121 may be a primary cell (PCell) and the one or more second cells 122 may be secondary cells (SCell).

Action 301

In this Action 201, the network node 110 provides the first indication to the wireless device 130. The first indication comprises the configuration, per configured event, of the one or more events. Each of the one or more events sets the condition to trigger the measurement report. At least one of the one or more events is configured in at least one reportConfig, linked to a measurement object whose RS Type within the reportConfig is set to one type of signal of the one or more types of signals to perform measurements on.

Providing may be understood as e.g., sending. The sending in this Action 301 may be implemented, e.g., via the first link 141.

The first indication may for example be, an information element in MeasConfig. In some embodiments, the provided configuration may be a reportConfig.

The one or more types of signals of signal may comprise: an RS in the SS Block, such as NR-PSS and/or NR-SSS and/or PBCH DRMS, or the CSI-RSs.

The configurations that may be comprised in the first indication have already been described in relation to Action 202 earlier, and are described again, in relation to the next Action 302.

Action 302

In this Action 302, the network node 110, obtains, based on the provided first indication, the second indication from the wireless device 130. The second indication is based on the measurements, by the wireless device 130, on the at least the one type of signal that is set within the reportConfig.

The indication may be for example comprised in, e.g., measResults.

In some embodiments, the second indication may be further based on which event of the at least one of the one or more events may be configured, and what RS Type may be configured.

In some embodiments, the at least one of the one or more events is A1, wherein the event A1 is configured and is linked to the measurement object associated to the first cell 121. In some embodiments, the at least one of the one or more events is A2, wherein the event A2 is configured and is linked to the measurement object associated to the first cell 121.

In some first embodiments, wherein the at least one of the one or more events is one of A1 and A2, one of the following two options may apply.

In a first option, the measurement object is associated to the first cell 121, and is linked to the at least one reportConfig, whose RS Type is set to SS. According to such first option, the second indication is based on the first cell 121 measurements performed by the wireless device 130 based on the SS.

In a second option, the measurement object is associated to the first cell 121, and is linked to the at least one reportConfig, whose RS Type is set to CSI-RS. According to such second option, the second indication is based on the first cell 121 measurements performed by the wireless device 130 based on the CSI-RS.

In some embodiments, wherein the at least one of the one or more events is A3, one of the following two options may apply.

In a first option, the A3 event is configured in the at least one reportConfig linked to the measurement object, whose RS Type is set to SS. According to such first option, and the second indication is based on the first cell 121 measurements performed by the wireless device 130 at least based on the SS.

In a second option, the A3 event is configured in the at least one reportConfig linked to a measurement object, whose RS Type is set to CSI-RS. According to such second option, the second indication is based on the first cell 121 measurements performed by the wireless device 130 at least based on the CSI-RS.

In some embodiments, wherein the at least one of the one or more events is A4, at least one of the following four options may apply.

In a first option, the A4 event is configured in the at least one reportConfig linked to the measurement object, whose RS Type is set to SS. According to such first option, the second indication is based on the first cell 121 measurements performed by the wireless device 130 based on SS.

In a second option, the A4 event is configured in the at least one reportConfig linked to the measurement object, whose RS Type is set to CSI-RS. According to such second option, the second indication is based on the first cell 121 measurements performed by the wireless device 130 based on CSI-RS.

In a third option, the A4 event is configured in the at least one reportConfig linked to the measurement object, whose RS Type is set to CSI-RS, wherein the CSI-RS is not configured for the wireless device 130. According to such third option, the second indication is based on the first cell 121 measurements based on SS.

In a fourth option, the A4 event is configured in the at least one reportConfig linked to the measurement object, whose RS Type is set to CSI-RS, wherein the CSI-RS is not configured for the first cell 121. According to such fourth option, the network node 110 receives a notification from the wireless device 130, wherein the notification notifies of a failure related to cell level measurements of the first cell 121.

In some embodiments, wherein the at least one of the one or more events is A5, one of the following two options may apply.

In a first option, the A5 event is configured in the at least one reportConfig linked to the measurement object whose RS Type is set to SS. According to such first option, the second indication is based on the first cell 121 measurements performed by the wireless device 130 based on SS.

In a second option, the A5 event is configured in the at least one reportConfig linked to a measurement object, whose RS Type is set to CSI-RS. According to such second option, the second indication is based on the first cell 121 measurements performed by the wireless device 130 based on CSI-RS.

In some embodiments, wherein the at least one of the one or more events is A6, at least one of the following two options may apply.

In a first option, the A6 event is configured in the at least one reportConfig linked to the measurement object, whose RS Type is set to SS. According to such first option, the second indication is based on measurements performed by the wireless device 130 on the one or more second cells 122 based on SS at least for the one or more second cells 122 associated to the frequency associated to the measurement object linked to the configured one or more second cells 122.

In a second option, the A6 event is configured in the at least one reportConfig linked to a measurement object whose RS Type is set to CSI-RS. According to such second option, the second indication is based on measurements performed by the wireless device 130 on the one or more second cells 122 based on CSI-RS at least for the one or more second cells 122 associated to the frequency associated to the measurement object linked to the configured one or more second cells 122.

In some embodiments, the second indication may further comprise the cell level information, based on the provided first indication.

In some embodiments, the second indication may further comprise beam level information, based on the provided first indication.

Figure 4:
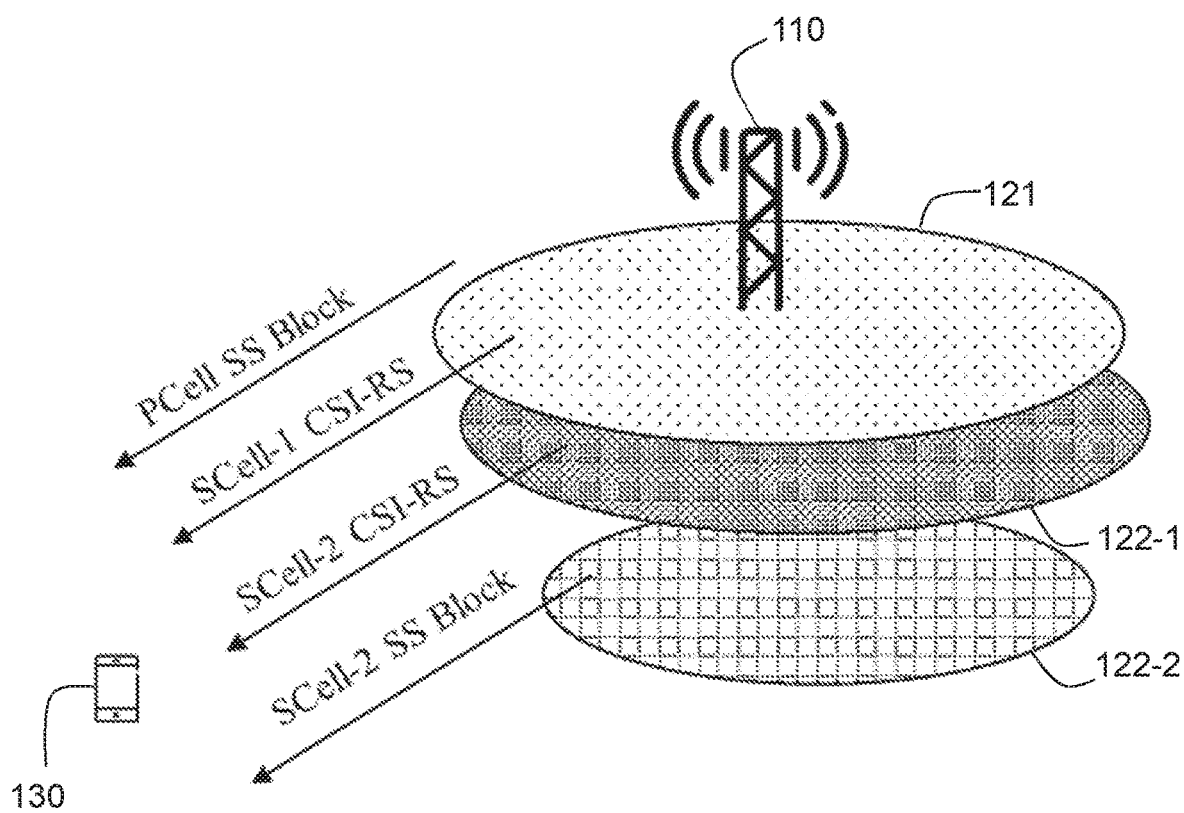
FIG. 4 is a schematic diagram illustrating an example scenario according to embodiments herein.

An example scenario of examples herein is depicted in FIG. 4. The network node 110 may configure the wireless device 130 with 2 different second cells 122, which are Secondary Cells (SCells), SCell-1, noted in the Figure as 122-1, and SCell-2, noted in the Figure as 122-2. The network node 110 may also configure the CSI-RS corresponding to the SCells and for the first cell 121, which in this example is a PCell.

To determine which RS to perform measurements on, embodiments herein will now be described with some non-limiting examples. In the following description, any reference to a/the PCell may be understood to relate to the first cell 121, and any reference to a/the SCells may be understood to relate to the one or more second cells 122.

In this example, the wireless device 130, e.g., a UE, may derive the RS Type to be used for the PCell measurement results, based on the configuration provided per configured event as described in Action 202. PCell is used in the explanation of this example, however the same may be understood to be true for SCell as well.

If an event A1 is configured, that is, the serving cell becomes better than a threshold, and is linked to the measurement object associated to the PCell by a given measurement identifier (id), the event A1 may be triggered if the PCell measurement result, e.g., RSRP, if triggerQuantity is set to RSRP, also in reportConfig, becomes better than threshold. Or, if an event A2 is configured, that is, the serving cell becomes worse than threshold, and is linked to the measurement object associated to the PCell by a given measurement id, the event A2 may be triggered if the PCell measurement result, e.g., RSRP, if triggerQuantity is set to RSRP, also in reportConfig, becomes worse than threshold. For either A1 or A2, the following may apply:

If the measurement object, e.g., carrier frequency, associated to the PCell is linked to at least one reportConfig whose RS Type is set to SS, the wireless device 130 may perform PCell measurements based on the SS. That is, the wireless device 130 may determine, In Action 202, to perform the PCell measurements based on the SS, and then perform the measurements accordingly.

If the measurement object, e.g. carrier frequency, associated to the PCell is linked to at least one reportConfig whose RS Type is set to CSI-RS, the wireless device 130 may perform PCell measurements based on the CSI-RS. That is, the wireless device 130 may determine, In Action 202, to perform the PCell measurements based on the CSI-RS, and then perform the measurements accordingly.

If an event A3 is configured, that is, neighbour becomes amount of offset better than PCell/PSCell, and is linked to the measurement object, e.g., MO-n, by a given measurement id, the event A3 may be triggered if any neighbor cell measurement result, e.g. RSRP, if triggerQuantity is set to RSRP, also in reportConfig, becomes an amount of offset better than PCell/PSCell. For A3, the following may apply:

If there is at least one A3 event configured in at least one reportConfig linked to a measurement object whose RS Type is set to SS, the wireless device 130 may perform PCell measurements at least based on the SS. That is, the wireless device 130 may determine, In Action 202, to perform the PCell measurements based on the SS, and then perform the measurements accordingly;

If there is at least one A3 event configured in at least one reportConfig linked to a measurement object whose RS Type is set to CSI-RS, the wireless device 130 may perform PCell measurements at least based on the CSI-RS. That is, the wireless device 130 may determine, In Action 202, to perform the PCell measurements based on the CSI-RS, and then perform the measurements accordingly.

If an event A4 is configured, that is, Neighbour becomes better than an absolute threshold, and is linked to the measurement object, e.g., MO-n, by a given measurement id, the event A4 may be triggered if any neighbor cell measurement result, e.g., RSRP, if triggerQuantity is set to RSRP, also in reportConfig, becomes better than an absolute threshold. For A4, the following may apply:

If there is at least one A4 event configured in at least one reportConfig linked to a measurement object whose RS Type is set to SS, the wireless device 130 may not be required to perform PCell measurements;

If there is at least one A4 event configured in at least one reportConfig linked to a measurement object whose RS Type is set to SS, the wireless device 130 may perform PCell measurement results based on SS. That is, the wireless device 130 may determine, In Action 202, to perform the PCell measurements based on the SS, and then perform the measurements accordingly;

If there is at least one A4 event configured in at least one reportConfig linked to a measurement object whose RS Type is set to CSI-RS, the wireless device 130 may perform PCell measurement results based on CSI-RS. That is, the wireless device 130 may determine, In Action 202, to perform the PCell measurements based on the CSI-RS, and then perform the measurements accordingly;

If there is at least one A4 event configured in at least one reportConfig linked to a measurement object whose RS Type is set to CSI-RS and if the CSI-RS is not configured for the PCell, the wireless device 130 may perform PCell measurement results based on SS. That is, the wireless device 130 may determine, In Action 202, to perform the PCell measurements based on the SS, and then perform the measurements accordingly;

If there is at least one A4 event configured in at least one reportConfig linked to a measurement object whose RS Type is set to CSI-RS and if the CSI-RS is not configured for the PCell, the wireless device 130 may notify the network node 110 of a failure related to cell level measurements of the PCell;

If an event A5 is configured, that is, PCell/PSCell becomes worse than an absolute threshold1 AND Neighbour becomes better than another absolute threshold2, and is linked to the measurement object, e.g., MO-n, by a given measurement id, the event A5 may be triggered if any neighbor cell measurement result, e.g., RSRP, if triggerQuantity is set to RSRP, also in reportConfig, becomes better than absolute threshold2 AND PCell/PSCell becomes worse than absolute threhsold2. For A5, the following may apply:

If there is at least one A5 event configured in at least one reportConfig linked to a measurement object whose RS Type is set to SS, the wireless device 130 may perform PCell measurement results based on SS. That is, the wireless device 130 may determine, In Action 202, to perform the PCell measurements based on the SS, and then perform the measurements accordingly;

If there is at least one A5 event configured in at least one reportConfig linked to a measurement object whose RS Type is set to CSI-RS, the wireless device 130 may perform PCell measurement results based on CSI-RS. That is, the wireless device 130 may determine, In Action 202, to perform the PCell measurements based on the CSI-RS, and then perform the measurements accordingly;

For the events A5 and A3 the wireless device 130 may either perform PCell or PSCell measurements when indicated by the network node 110, e.g. in the reportConfig.

If an event A6 is configured, that is, Neighbour becomes an amount of offset better than SCell, and is linked to the measurement object, e.g., MO-n, by a given measurement id, the event A6 may be triggered if any neighbor cell measurement result, e.g., RSRP, if triggerQuantity is set to RSRP, also in reportConfig, becomes an amount of offset better than SCell. For A6, the following may apply:

If there is at least one A6 event configured in at least one reportConfig linked to a measurement object whose RS Type is set to SS, the wireless device 130 may perform SCell measurement results based on SS at least for the SCell associated to the frequency associated to the measurement object linked to the configured SCell. That is, the wireless device 130 may determine, In Action 202, to perform the SCell measurements based on the SS, and then perform the measurements accordingly.

If there is at least one A6 event configured in at least one reportConfig linked to a measurement object whose RS Type is set to CSI-RS, the wireless device 130 may perform SCell measurement results based on CSI-RS at least for the SCell associated to the frequency associated to the measurement object linked to the configured SCell. That is, the wireless device 130 may determine, In Action 202, to perform the SCell measurements based on the CSI-RS, and then perform the measurements accordingly.

An example of the RS Type (rsType) that may be included in the reportConfig for some embodiments herein is shown in the figure below. Depending on which event is configured and what rsType is configured, the wireless device 130 may include the PCell and SCell measurements as indicated in the previous explanation.

```
--------  Begin ReportConfigEUTRA information element  --------
-- ASN1START
ReportConfigEUTRA ::=                   SEQUENCE {
    triggerType                             CHOICE {
        event                                   SEQUENCE {
            eventId                                 CHOICE {
                eventA1                                 SEQUENCE {
                    a1-Threshold                            ThresholdEUTRA
                },
                eventA2                                 SEQUENCE {
                    a2-Threshold                            ThresholdEUTRA
                },
                eventA3                                 SEQUENCE {
                    a3-Offset                               INTEGER (-30..30),
                    reportOnLeave                           BOOLEAN
                },
                eventA4                                 SEQUENCE {
                    a4-Threshold                            ThresholdEUTRA
                },
                eventA5                                 SEQUENCE {
                    a5-Threshold1                           ThresholdEUTRA,
                    a5-Threshold2                           ThresholdEUTRA
                },
                ...,
                eventA6-r10                             SEQUENCE {
                    a6-Offset-r10                           INTEGER (-30..30),
                    a6-ReportOnLeave-r10                    BOOLEAN
                },
                eventC1-r12                             SEQUENCE {
                    c1-Threshold-r12                        ThresholdEUTRA-v1250,
                    c1-ReportOnLeave-r12                    BOOLEAN
                },
                eventC2-r12                             SEQUENCE {
                    c2-RefCSI-RS-r12                        MeasCSI-RS-Id-r12,
                    c2-Offset-r12                           INTEGER (-30..30),
                    c2-ReportOnLeave-r12                    BOOLEAN
                }
            },
            hysteresis                              Hysteresis,
            timeToTrigger                           TimeToTrigger
        },
        periodical                              SEQUENCE{
            purpose                                 ENUMERATED {
                                                        reportStrongestCells, reportCGI}
}
```

-continued

```
},
triggerQuantity              ENUMERATED {rsrp, rsrq},
reportQuantity               ENUMERATED {sameAsTriggerQuantity, both},
maxReportCells                   INTEGER (1..maxCellReport),
rsType                       ENUMERATED {SS, CSI-RS, both}
includeBeamReport                BOOLEAN
reportInterval                   ReportInterval,
         ---------     End ReportConfigEUTRA information element ---------
```

All the above mentioned description may be understood to hold true if the PCell or SCell is replaced with PSCell.

An advantage of embodiments herein is that the measurement report may contain the quality of SCells based on different RS types. For example, the network may want to know the quality of narrow beams of SCells for CA purposes, while the quality of wide beams may be more important for the PCell, where coverage may be considered to be more important and/or where control channel robustness may be considered to be important.

Figure 5:
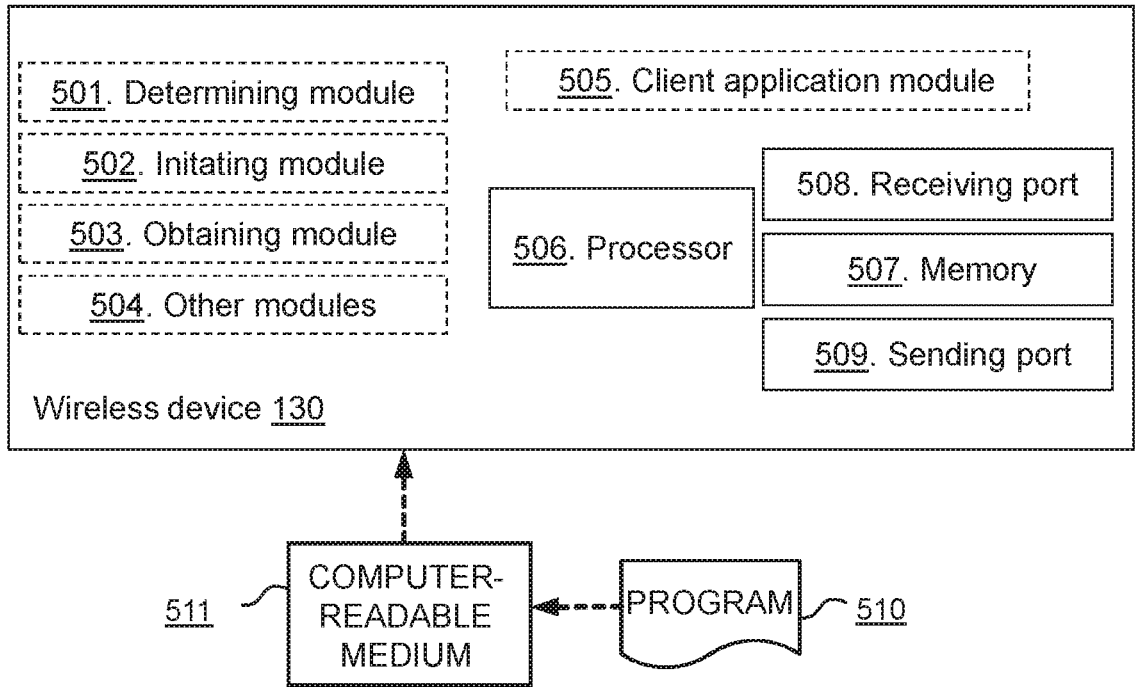
FIG. 5 is a schematic block diagram illustrating two non-limiting examples, a) and b), of a wireless device, according to embodiments herein.
Figure 5:
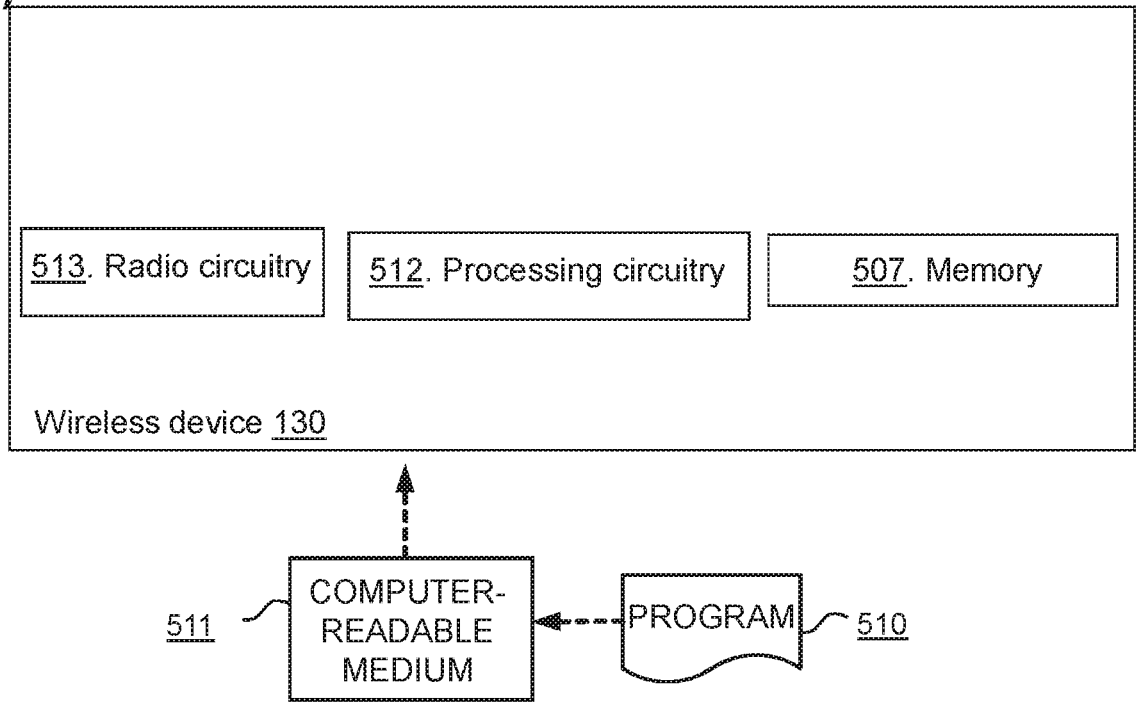

FIG. 5 depicts two different examples in panels a) and b), respectively, of the arrangement that the wireless device 130 may comprise to perform the method actions described above in relation to FIG. 2. The wireless device 130 is configured to handle the measurements by the wireless device 130 on the set of cells configured to comprise at least the first cell 121. The wireless device 130 is configured to operate in the wireless communications network 100. In some embodiments, the wireless device 130 may comprise the following arrangement depicted in FIG. 5a.

The detailed description of some of the following corresponds to the same references provided above, in relation to the actions described for the wireless device 130, and will thus not be repeated here. For example, the set of cells is configured to be serving cells.

In FIG. 5, optional modules are indicated with dashed boxes.

The wireless device 130 may be configured to perform the determining of Action 202, e.g. by means of a determining module 501 within the wireless device 130, configured to determine the one or more types of signals to perform measurements on for each cell in the set of cells. To determine is configured to be based on the configuration configured to be obtained, per configured event, of the one or more events, wherein each of the one or more events is configured to set a condition to trigger a measurement report. At least one of the one or more events is configured in at least one reportConfig configured to be linked to a measurement object whose Reference Signal (RS) Type within the reportConfig is configured to be set to one type of signal of the one or more types of signals. The wireless device 130 is configured to determine to perform the measurements on at least the one type of signal that is configured to be set. The obtaining module 501 may be a processor 506 of the wireless device 130, or an application running on such processor.

The wireless device 130 may be configured to perform the initiating of Action 203, e.g. by means of an initiating module 502 within the wireless device 130 configured to initiate sending the indication to the network node 110 configured to serve the wireless device 130. The indication is configured to be based on the measurements by the wireless device 130 on the one or more types of signals configured to be determined. The initiating module 502 may be the processor 506 of the wireless device 130, or an application running on such processor.

In some embodiments, the indication may be further configured to comprise cell level information, based on the one or more types of signals configured to be determined.

The indication may be further configured to comprise beam level information, based on the one or more types of signals configured to be determined.

In some embodiments, the configuration configured to be obtained may be the reportConfig.

In some embodiments, the indication may be the second indication. In such embodiments, the wireless device 130 may be configured to perform the obtaining of Action 201, e.g. by means of an obtaining module 503 within the wireless device 130 configured to obtain the first indication from the network node 110, the first indication being configured to comprise the configuration. The obtaining module 503 may be the processor 506 of the wireless device 130, or an application running on such processor.

The one or more types of signals may comprise: an RS in the SS Block, or a CSI-RSs.

In some embodiments, one of the following may apply: a) the at least one of the one or more events is A1, wherein the event A1 is configured and is configured to be linked to the measurement object configured to be associated to the first cell 121; and b) the at least one of the one or more events is A2, wherein the event A2 is configured and is configured to be linked to the measurement object configured to be associated to the first cell 121.

In some embodiments, the at least one of the one or more events may be one of A1 and A2. In such embodiments, at least one of the following may apply: a) the measurement object is configured to be associated to the first cell 121, and is configured to be linked to the at least one reportConfig, whose RS Type is configured to be set to SS, and the wireless device 130 is further configured to perform first cell 121 measurements based on the SS; and b) the measurement object is configured to be associated to the first cell 121, and is configured to be linked to the at least one reportConfig, whose RS Type is configured to be set to CSI-RS, and the wireless device 130 is further configured to perform first cell 121 measurements based on the CSI-RS.

In some embodiments, the at least one of the one or more events may be A3. In such embodiments, at least one of the following may apply: a) the A3 event is configured in the at least one reportConfig configured to be linked to the measurement object, whose RS Type is configured to be set to SS, and the wireless device 130 is further configured to perform first cell 121 measurements at least based on the SS; and b) the A3 event is configured in the at least one reportConfig configured to be linked to a measurement object, whose RS Type is configured to be set to CSI-RS, and the wireless device 130 is further configured to perform first cell 121 measurements at least based on the CSI-RS.

In some embodiments, the at least one of the one or more events may be A4. In such embodiments, at least one of the following may apply: a) the A4 event is configured in the at least one reportConfig configured to be linked to the measurement object, whose RS Type is configured to be set to SS, and the wireless device 130 is further configured to perform first cell 121 measurements based on SS; b) the A4 event is configured in the at least one reportConfig configured to be linked to the measurement object, whose RS Type is configured to be set to CSI-RS, and the wireless device 130 is further configured to perform first cell 121 measurements based on CSI-RS; c) the A4 event is configured in the at least one reportConfig configured to be linked to the measurement object, whose RS Type is configured to be set to CSI-RS, wherein the CSI-RS is not configured for the wireless device 130, and the wireless device 130 is further configured to perform first cell 121 measurements based on SS; d) the A4 event is configured in the at least one reportConfig configured to be linked to the measurement object, whose RS Type is configured to be set to CSI-RS, wherein the CSI-RS is not configured for the first cell 121, and the wireless device 130 is further configured to notify the network of a failure related to cell level measurements of the first cell 121.

In some embodiments, the at least one of the one or more events may be A5. In such embodiments, at least one of the following may apply: a) the A5 event is configured in the at least one reportConfig configured to be linked to the measurement object whose RS Type is configured to be set to SS, and the wireless device 130 is further configured to perform first cell 121 measurements based on SS; and b) the A5 event is configured in the at least one reportConfig configured to be linked to a measurement object, whose RS Type is configured to be set to CSI-RS, and the wireless device 130 is further configured to perform first cell 121 measurements based on CSI-RS.

In some embodiments, the set of cells may be further configured to further comprise the one or more second cells 122.

The first cell 121 may be configured to be the primary cell (PCell) and the one or more second cells 122 may be configured to be secondary cells (SCell).

In some embodiments, the at least one of the one or more events may be A6. In such embodiments, at least one of the following may apply: a) the A6 event is configured in the at least one reportConfig configured to be linked to the measurement object, whose RS Type is configured to be set to SS, and the wireless device 130 is further configured to perform one or more second cells 122 measurements based on SS at least for the one or more second cells 122 configured to be associated to the frequency associated to the measurement object configured to be linked to the configured one or more second cells 122; and b) the A6 event is configured in the at least one reportConfig configured to be linked to a measurement object whose RS Type is configured to be set to CSI-RS, and the wireless device 130 is further configured to perform one or more second cells 122 measurements based on CSI-RS at least for the one or more second cells 122 configured to be associated to the frequency associated to the measurement object configured to be linked to the configured one or more second cells 122.

The indication may be further configured to be based on which event of the at least one of the one or more events is configured, and what RS Type may be configured.

Other modules 504 may be comprised in the wireless device 130.

The wireless device 130 may also comprise a client application module 505, which may be configured to communicate user data with a host application module 801 in the host computer 150, e.g., via the third link 150.

The wireless device 130 may comprise an interface unit or a communication interface configured to facilitate communications between the wireless device 130 and other nodes or devices, e.g., any of the network node 110 and the host computer 150, or any of the other nodes. The interface may, for example, include a transceiver configured to transmit and receive radio signals over an air interface in accordance with a suitable standard.

Figure 9:
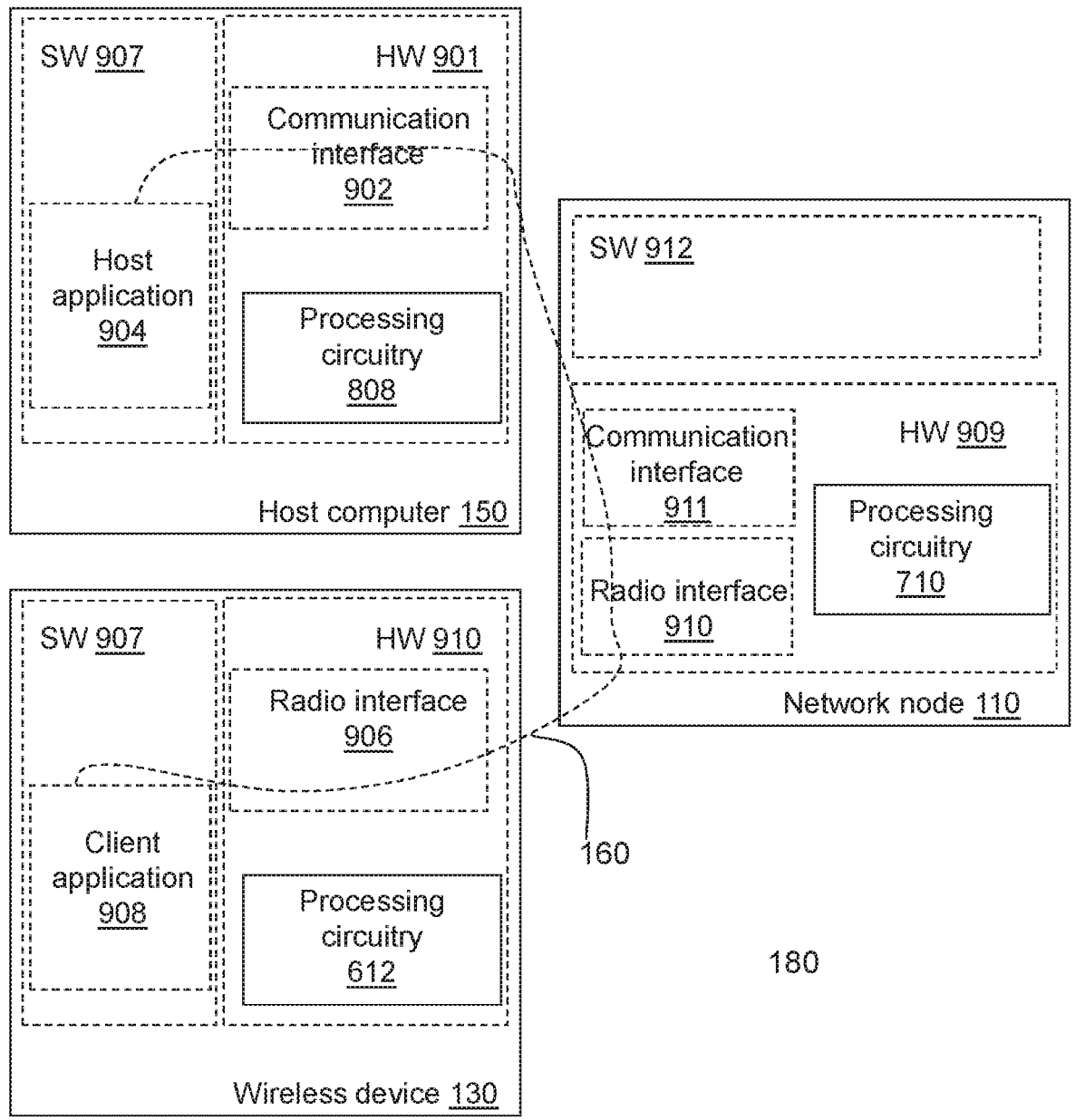
FIG. 9 is a schematic block diagram illustrating a telecommunications system, according to embodiments herein.

The wireless device 130 may comprise an arrangement as shown in FIG. 5 or in FIG. 9.

The embodiments herein in the wireless device 130 may be implemented through one or more processors, such as a processor 506 in the wireless device 130 depicted in FIG. 5a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 507 comprising one or more memory units. The memory 507 is arranged to be used to store obtained information, store data, configurations, schedulings, and applications etc. to perform the methods herein when being executed in the wireless device 130.

In some embodiments, the wireless device 130 may receive information from, e.g., any of the network node 110 and the host computer 150, through a receiving port 508. In some embodiments, the receiving port 508 may be, for example, connected to one or more antennas in wireless device 130. In other embodiments, the wireless device 130 may receive information from another structure in the wireless communications network 100 through the receiving port 508. Since the receiving port 508 may be in communication with the processor 506, the receiving port 508 may then send the received information to the processor 506. The receiving port 508 may also be configured to receive other information.

The processor 506 in the wireless device 130 may be further configured to transmit or send information to e.g., any of the network node 110 and the host computer 150, another structure in the wireless communications network 100, through a sending port 509, which may be in communication with the processor 506, and the memory 507.

Those skilled in the art will also appreciate that the determining module 501, the initiating module 502, the obtaining module 503, the other modules 504 and the client application module 505 described above may refer to a combination of analog and digital modules, and/or one or more processors configured with software and/or firmware, e.g., stored in memory, that, when executed by the one or more processors such as the processor 506, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 501-505 described above may be implemented as one or more applications running on one or more processors such as the processor 506.

Thus, the methods according to the embodiments described herein for the wireless device 130 may be respectively implemented by means of a computer program 510 product, comprising instructions, i.e., software code portions, which, when executed on at least one processor 506, cause the at least one processor 506 to carry out the actions described herein, as performed by the wireless device 130. The computer program 510 product may be stored on a computer-readable storage medium 511. The computer-readable storage medium 511, having stored thereon the computer program 510, may comprise instructions which, when executed on at least one processor 506, cause the at least one processor 506 to carry out the actions described herein, as performed by the wireless device 130. In some embodiments, the computer-readable storage medium 511 may be a non-transitory computer-readable storage medium, such as a CD ROM disc, or a memory stick. In other embodiments, the computer program 510 product may be stored on a carrier containing the computer program 510 just described, wherein the carrier is one of an electronic signal, optical signal, radio signal, or the computer-readable storage medium 511, as described above.

In other embodiments, the wireless device 130 may comprise the following arrangement depicted in FIG. 5b. The wireless device 130 may comprise a processing circuitry 512, e.g., one or more processors such as the processor 506, in the wireless device 130 and the memory 507. The wireless device 130 may also comprise a radio circuitry 513, which may comprise e.g., the receiving port 508 and the sending port 509. The processing circuitry 512 may be configured to, or operable to, perform the method actions according to FIG. 2, in a similar manner as that described in relation to FIG. 5a. The radio circuitry 513 may be configured to set up and maintain at least a wireless connection with any of the network node 110 and the host computer 150. Circuitry may be understood herein as a hardware component.

Hence, embodiments herein also relate to the wireless device 130 operative to handle measurements by the wireless device 130, the wireless device 130 being operative to operate in the wireless communications network 100. The wireless device 130 may comprise the processing circuitry 512 and the memory 507, said memory 507 containing instructions executable by said processing circuitry 512, whereby the wireless device 130 is further operative to perform the actions described herein in relation to the wireless device 130, e.g., in FIG. 2.

Figure 6:
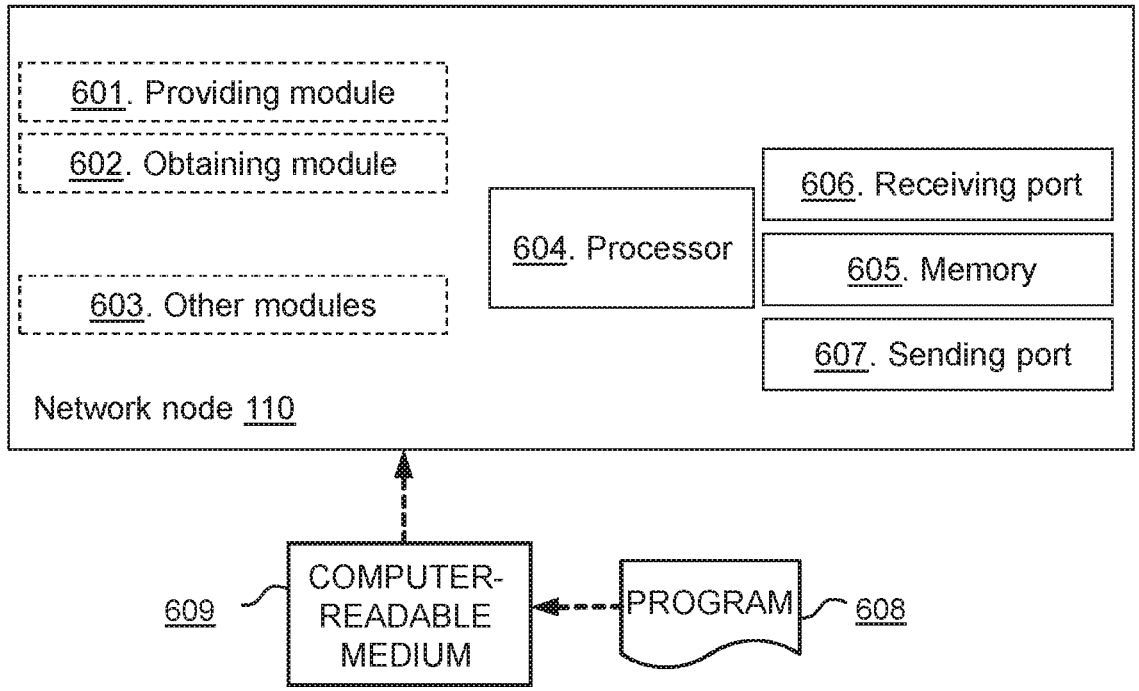
FIG. 6 is a schematic block diagram illustrating two non-limiting examples, a) and b), of a network node, according to embodiments herein.
Figure 6:
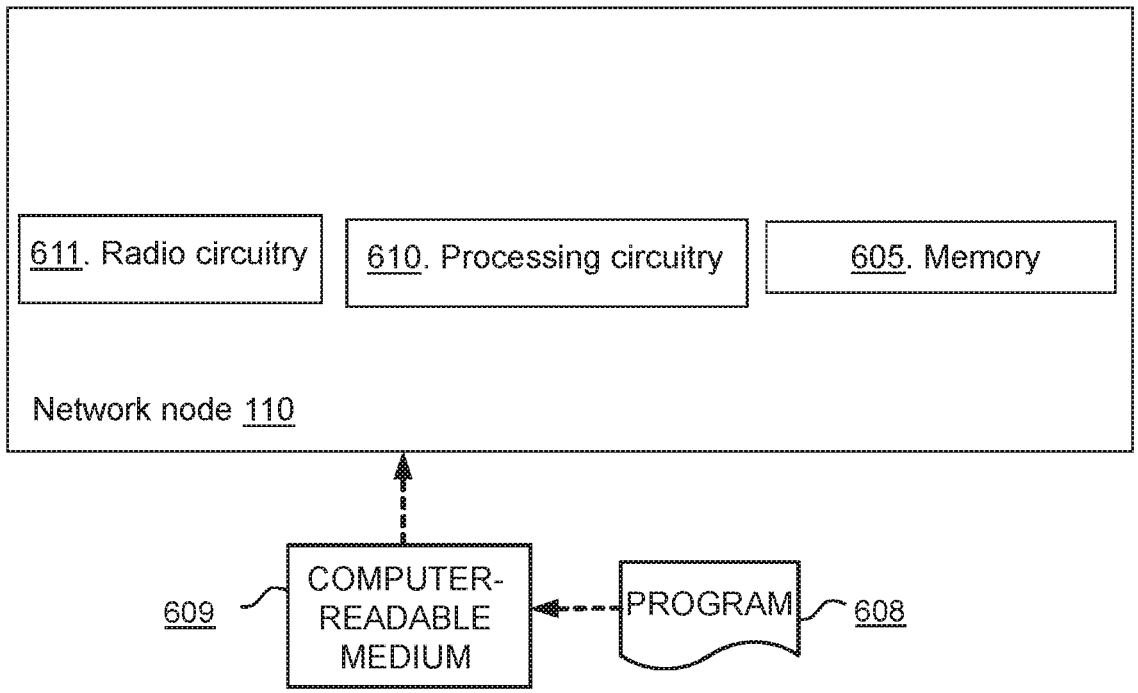

FIG. 6 depicts two different examples in panels a) and b), respectively, of the arrangement that the network node 110 may comprise to perform the method actions described above in relation to FIG. 3. The network node 110 is configured to handle measurements by the wireless device 130 on the set of cells configured to comprise at least the first cell 121. The network node 110 and the wireless device 130 are configured to operate in the wireless communications network 100. In some embodiments, the network node 110 may comprise the following arrangement depicted in FIG. 6a.

The detailed description of some of the following corresponds to the same references provided above, in relation to the actions described for the network node 110, and will thus not be repeated here. For example, the set of cells are configured to be serving cells.

In FIG. 6, optional modules are indicated with dashed boxes.

The network node 110 is configured to perform the providing of Action 301, e.g. by means of a providing module 701 within the network node 110 configured to provide the first indication to the wireless device 130. The first indication is configured to comprise the configuration, per configured event, of the one or more events. Each of the one or more events is configured to set a condition to trigger a measurement report. At least one of the one or more events is configured in at least one reportConfig, configured to be linked to the measurement object whose RS Type within the reportConfig is configured to be set to one type of signal of one or more types of signals to perform measurements on. The providing module 601 may be a processor 604 of the network node 110, or an application running on such processor.

The network node 110 is configured to perform this obtaining of Action 302, e.g. by means of an obtaining module 602 within the network node 110, configured to obtain, based on the first indication configured to be provided, the second indication from the wireless device 130, the second indication being configured to be based on the measurements, by the wireless device 130, on the at least one type of signal that is configured to be set within the reportConfig. The obtaining module 602 may be the processor 604 of the network node 110, or an application running on such processor.

The second indication may be further configured to comprise the cell level information, based on the first indication configured to be provided.

In some embodiments, the second indication may be further configured to comprise the beam level information, based on the first indication configured to be provided.

The configuration configured to be provided may be the reportConfig.

The one or more types of signals may comprise: an RS in the SS Block, or a CSI-RSs.

In some embodiments, at least one of the following may apply: a) the at least one of the one or more events is A1, wherein the event A1 is configured and is configured to be linked to the measurement object configured to be associated to the first cell 121; and b) the at least one of the one or more events is A2, wherein the event A2 is configured and is configured to be linked to the measurement object configured to be associated to the first cell 121.

In some embodiments, the at least one of the one or more events may be one of A1 and A2. In such embodiments, at least one of the following may apply: a) the measurement object is configured to be associated to the first cell 121, and is configured to be linked to the at least one reportConfig, whose RS Type is configured to be set to SS, and the second indication is configured to be based on first cell 121 measurements configured to be performed by the wireless device 130 based on the SS; and b) the measurement object is configured to be associated to the first cell 121, and is configured to be linked to the at least one reportConfig, whose RS Type is configured to be set to CSI-RS, and the second indication is configured to be based on first cell 121 measurements configured to be performed by the wireless device 130 based on the CSI-RS.

In some embodiments, the at least one of the one or more events may be A3. In such embodiments, at least one of the following may apply: a) the A3 event is configured in the at least one reportConfig configured to be linked to the measurement object, whose RS Type is configured to be set to SS, and the second indication is configured to be based on first cell 121 measurements configured to be performed by the wireless device 130 at least based on the SS; and b) the A3 event is configured in the at least one reportConfig configured to be linked to a measurement object, whose RS Type is configured to be set to CSI-RS, and the second indication is configured to be based on first cell 121 measurements configured to be performed by the wireless device 130 at least based on the CSI-RS.

In some embodiments, the at least one of the one or more events may be A4. In such embodiments, at least one of the following may apply: a) the A4 event is configured in the at least one reportConfig configured to be linked to the measurement object, whose RS Type is configured to be set to SS, and the second indication is configured to be based on first cell 121 measurements configured to be performed by the wireless device 130 based on SS; b) the A4 event is configured in the at least one reportConfig configured to be linked to the measurement object, whose RS Type is configured to be set to CSI-RS, and the second indication is configured to be based on first cell 121 measurements configured to be performed by the wireless device 130 based on CSI-RS; c) the A4 event is configured in the at least one reportConfig configured to be linked to the measurement object, whose RS Type is configured to be set to CSI-RS, wherein the CSI-RS is not configured for the wireless device 130, and the second indication is configured to be based on first cell 121 measurements configured to be performed by the wireless device 130 based on SS; and d) the A4 event is configured in the at least one reportConfig configured to be linked to the measurement object, whose RS Type is configured to be set to CSI-RS, wherein the CSI-RS is not configured for the first cell 121, and the network node 110 is configured to receive a notification from the wireless device 130, wherein the notification is configured to notify of a failure related to cell level measurements of the first cell 121.

In some embodiments, the at least one of the one or more events may be A5. In such embodiments, at least one of the following may apply: a) the A5 event is configured in the at least one reportConfig configured to be linked to the measurement object whose RS Type is configured to be set to SS, and the second indication is configured to be based on first cell 121 measurements configured to be performed by the wireless device 130 based on SS; and b) the A5 event is configured in the at least one reportConfig configured to be linked to a measurement object, whose RS Type is configured to be set to CSI-RS, and the second indication is configured to be based on first cell 121 measurements configured to be performed by the wireless device 130 based on CSI-RS.

The set of cells may be further configured to comprise the one or more second cells 122.

The first cell 121 may be a configured to be the primary cell (PCell) and the one or more second cells 122 may be configured to be secondary cells (SCell).

In some embodiments, the at least one of the one or more events may be A6. In such embodiments, at least one of the following may apply: a) the A6 event is configured in the at least one reportConfig configured to be linked to the measurement object, whose RS Type is configured to be set to SS, and the second indication is configured to be based on measurements configured to be performed by the wireless device 130 on one or more second cells 122 based on SS at least for the one or more second cells 122 configured to be associated to the frequency associated to the measurement object configured to be linked to the configured one or more second cells 122; and b) the A6 event is configured in the at least one reportConfig configured to be linked to a measurement object whose RS Type is configured to be set to CSI-RS, and the second indication is configured to be based on measurements configured to be performed by the wireless device 130 on one or more second cells 122 configured to be based on CSI-RS at least for the one or more second cells 122 configured to be associated to the frequency configured to be associated to the measurement object configured to be linked to the configured one or more second cells 122.

In some embodiments, the second indication may be further configured to be based on which event of the at least one of the one or more events is configured, and what RS Type is configured.

Other modules 603 may be comprised in the network node 110.

The embodiments herein in the network node 110 may be implemented through one or more processors, such as a processor 604 in the network node 110 depicted in FIG. 6a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 605 comprising one or more memory units. The memory 605 is arranged to be used to store obtained information, store data, configurations, schedulings, and applications etc. to perform the methods herein when being executed in the network node 110.

In some embodiments, the network node 110 may receive information from, e.g., any of the wireless device 130 and the host computer 150, through a receiving port 606. In some embodiments, the receiving port 606 may be, for example, connected to one or more antennas in network node 110. In other embodiments, the network node 110 may receive information from another structure in the wireless communications network 100 through the receiving port 606. Since the receiving port 606 may be in communication with the processor 604, the receiving port 606 may then send the received information to the processor 604. The receiving port 606 may also be configured to receive other information.

The processor 604 in the network node 110 may be further configured to transmit or send information to e.g., any of wireless device 130 and the host computer 150, or another structure in the wireless communications network 100, through a sending port 607, which may be in communication with the processor 604, and the memory 605.

Those skilled in the art will also appreciate that the providing module 601, the obtaining module 602, and the other modules 603 described above may refer to a combination of analog and digital modules, and/or one or more processors configured with software and/or firmware, e.g., stored in memory, that, when executed by the one or more processors such as the processor 604, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 601-603 described above may be implemented as one or more applications running on one or more processors such as the processor 604.

Thus, the methods according to the embodiments described herein for the network node 110 may be respectively implemented by means of a computer program 608 product, comprising instructions, i.e., software code portions, which, when executed on at least one processor 604, cause the at least one processor 604 to carry out the actions described herein, as performed by the network node 110. The computer program 608 product may be stored on a computer-readable storage medium 609. The computer-readable storage medium 609, having stored thereon the computer program 608, may comprise instructions which, when executed on at least one processor 604, cause the at least one processor 604 to carry out the actions described herein, as performed by the network node 110. In some embodiments, the computer-readable storage medium 609 may be a non-transitory computer-readable storage medium, such as a CD ROM disc, or a memory stick. In other embodiments, the computer program 608 product may be stored on a carrier containing the computer program 608 just described, wherein the carrier is one of an electronic signal, optical signal, radio signal, or the computer-readable storage medium 609, as described above.

The network node 110 may comprise an interface unit or a communication interface configured to facilitate communications between the network node 110 and other nodes or devices, e.g., any of the first wireless device 130 and the host computer 150, or any of the other nodes. In some particular examples, the interface may, for example, include a transceiver configured to transmit and receive radio signals over an air interface in accordance with a suitable standard.

In other embodiments, the network node 110 may comprise the following arrangement depicted in FIG. 6b. The network node 110 may comprise a processing circuitry 610, e.g., one or more processors such as the processor 604, in the network node 110 and the memory 605. The network node 110 may also comprise a radio circuitry 611, which may comprise e.g., the receiving port 606 and the sending port 607. The processing circuitry 611 may be configured to, or operable to, perform the method actions according to FIG. 3, in a similar manner as that described in relation to FIG. 6a. The radio circuitry 611 may be configured to set up and maintain at least a wireless connection with any of the wireless device 130 and the host computer 150. Circuitry may be understood herein as a hardware component.

Hence, embodiments herein also relate to the network node 110 operative to handle measurements by the wireless device 130, the network node 110 being operative to operate in the wireless communications network 100. The network node 110 may comprise the processing circuitry 610 and the memory 605, said memory 605 containing instructions executable by said processing circuitry 610, whereby the network node 110 is further operative to perform the actions described herein in relation to the network node 110, e.g., in FIG. 3.

Other Examples Related to Embodiments Herein

Examples of embodiments herein will now be provided. More specifically, the following are: a) examples related to a wireless device, such as the wireless device 130, e.g., a 5G UE; and b) examples related to a network node, such as the network node 110, e.g., a gNB.

The wireless device 130 examples relate to FIG. 2, FIG. 5, FIG. 6 and FIG. 9.

A method, performed by the wireless device 130 may comprise one or more of the following actions. The method may be for handling measurements by the wireless device 130 on the set of cells comprising the first cell 121 and the one or more second cells 122. The set of cells may be configured for usage by the wireless device 130. The wireless device 130 may be operating in the wireless communications network 100.

In some embodiments all the actions may be performed. In some embodiments, one or more actions may be performed. One or more embodiments may be combined, where applicable. All possible combinations are not described to simplify the description.

Determining 202: the one or more types of signals to perform measurements on, for each of the cells in the set of cells, the determination being based on whether or not a configuration for the one or more types of signals for each of the cells in the set of cells has been obtained.

The determination may be based on one or more default types of signals to perform measurements on for at least one of the cells in the set of cells, in case of at least one of: a) an absence of the obtained configuration by the wireless device 130; and b) the obtained configuration comprising the one or more types for less than all of the cells in the set of cells, that is, for not all of the cells in the set of cells.

The one or more default types of signals may be understood as a third group of one or more types of signals.

Initiating 203 sending the indication to a network node, e.g., the network node 110, serving the wireless device 130, the indication being based on the measurements by the wireless device 130 on the determined one or more types.

In such embodiments, the method may further comprise the action of:

Obtaining 201 the first indication from the network node 110, the first indication comprising the configuration.

The network node 110 examples relate to FIG. 3, FIG. 6, FIG. 7 and FIG. 9.

A method, performed by the network node 110 may comprise one or more of the following actions. The method may be for handling measurements by the wireless device 130 on the set of cells. The set of cells may comprise the first cell 121 and the one or more second cells 122. The set of cells may be configured for usage by the wireless device 130. The network node 110 and the wireless device 130 may be operating in the wireless communications network 100.

Providing 301 the first indication to the wireless device 130, the first indication comprising the configuration for the one or more types of signals to perform measurements on at least one of the cells in the set of cells.

Obtaining 302 the second indication from the wireless device 130. The second indication may be based on the measurements by the wireless device 130 based on the provided first indication.

The indication may be for example comprised in, e.g., measResults.

The provided configuration may comprise the one or more types for less than all of the cells in the set of cells.

The configuration in the provided first indication may be per configured event of one or more events, wherein each of the one or more events may set a condition to trigger a measurement or measurement report.

The second indication may further comprise beam level information, based on the provided first indication.

The first indication may be an information element in MeasConfig.

The first cell 121 may be a primary cell PCell and the one or more second cells 122 may be secondary cell SCell.

The one or more types of signals may comprise: an RS in the SS Block, such as NR-PSS and/or NR-SSS and/or PBCH DRMS or the CSI-RSs.

By the wireless device determining the one or more types of signals to perform measurements on for each of the cells in the set of cells, being based on whether or not the configuration for the one or more types of signals for each of the cells in the set of cells has been obtained, the measurement report may contain the quality of the cells in the set of cells, e.g., SCells, based on different types of signals, e.g., RS signals. By then initiating sending the indication to the network node, the network may be enabled to evaluate the quality of the cells based on both different signals, before establishing a dual connectivity or carrier aggregation. This may be particularly useful when, for example, the different types of signals may be beamformed signals, and the may be beamformed differently. One of the types of signals may be coverage oriented, e.g., more wide beams with uniform coverage, and another type of signal may be capacity oriented, e.g., more narrow beams but with spotty coverage. If the network node 110 obtains the SCell quality based on both these types of signals, it may be enabled to better judge whether a particular cell, e.g., a SCell, may be suitable for the wireless device 130 or not.

Particular examples of the examples related to the embodiments herein will now be described. In the following description, any reference to a/the UE may be understood to relate to the wireless device 130, and any reference to a/the network node may be understood to relate to the network node 110.

In a first related example, the wireless device 130 performs cell measurements based on all possible reference signals, for example, SS and CSI-RS, for each serving cell, i.e., for the PCell and the configured SCells. In that example, for NR, if the UE has configured K SCells per mandated trigger quantity, e.g., RSRP and RSRQ, the UE may, or may be required to or may be configured to, perform cell measurement results for the PCell and each SCell based on both the SS Block and CSI-RS. In other words, the UE may perform for the PCell:

PCell RSRP measurement result based on SS Block;
PCell RSRP measurement result based on CSI-RS;
PCell RSRQ measurement result based on SS Block;
PCell RSRQ measurement result based on CSI-RS;
And for each configured SCell(k), for k=1, . . . , K:
SCell(k) RSRP measurement result based on SS Block;
SCell(k) RSRP measurement result based on CSI-RS;
SCell(k) RSRQ measurement result based on SS Block;
SCell(k) RSRQ measurement result based on CSI-RS;

One possible UE action related to that related example may occur if the network may only have provided CSI-RS configuration associated to a subset of the serving cells, i.e., PCell and/or a subset of the configured SCells. In that case, in one approach, the UE may use the SS Block to perform cell measurement results. In another solution, the UE may notify the network of a failure, e.g., by indicating in an existing message or in a new message defined for that purpose.

In a second related example, the UE may have a single default RS type(s) for the PCell measurement results. In one approach in that related example, if no specific configuration for PCell RS Type may have been provided, or for the frequency and/or measurement object associated to that cell, the RS type may be set by the UE to SS Block. In another solution, if no configuration for PCell RS Type is provided, the RS type may be set by the UE to CSI-RS. In the case of CSI-RS as being default, the UE may still use the SS Block if a CSI-RS related configuration for the PCell has not been provided.

In a third example, the UE may have a single default RS type(s) for the SCell measurement results. In one approach in that example, if no specific configuration for SCell RS Type is provided, or for the frequency and/or measurement object associated to that cell, the RS type may be set by the UE to SS Block. In another approach, if no configuration for SCell RS Type is provided, the RS type may be set by the UE to CSI-RS. In the case of CSI-RS as being default, the UE may still use the SS Block if a CSI-RS related configuration for the SCell has not been provided.

In a third related example, the UE may be configured with the RS type to be used for serving cell measurements as part of the MeasObject, which may be one or a combination of the following alternatives:

Serving cell RS Type PCell (pCellRSType): Regardless if the MeasObjectNR is linked to a measurement identifier or not, the configured information may be used by the UE to interpret that the UE may perform PCell measurement results based on that RS Type. That may be in NR SS Block or CSI-RS. Based on the configured events linked to Measurement Objects (MOs), the UE may realize that the same RS type is used is all events requiring PCell measurements or, in the case that at least one event that requires PCell measurement results as trigger condition uses an RS Type different from the one provided in the measurement object, the UE may perform additional measurement results for the PCell based on that other RS Type.

Serving cell RS Type SCell (sCellRSType): Regardless if the MeasObjectNR is linked to a measurement identifier or not, the configured information may be used by the UE to interpret that the UE may perform SCell measurement results based on that RS Type for the configured SCell associated to the same frequency of that same MeasObjectNR. That may be an NR SS Block or CSI-RS. Based on the configured events linked to MOs, the UE may realize that the same RS type is used is all events requiring SCell measurements or, in the case that at least one event that requires SCell measurement results as trigger condition uses an RS Type different from the one provided in the measurement object, the UE may perform additional measurement results for the SCell based on that other RS Type.

```
                ------ Begin MeasObjectEUTRA information element ------
  -- ASN1START
-
-
-   MeasObjectEUTRA ::=         SEQUENCE {
-       carrierFreq             ARFCN-ValueEUTRA,
-       allowedMeasBandwidth    AllowedMeasBandwidth,
```

```
-    presenceAntennaPort1        PresenceAntennaPort1,
-    neighCellConfig                 NeighCellConfig,
-    pCellRSType                      ENUMERATED{SS, CSI-RS, both}
-    sCellRSType                      ENUMERATED{SS, CSI-RS, both}
-    offsetFreq                         Q-OffsetRange      DEFAULT dB0,

- ------       End MeasObjectEUTRA information element   -------
```

In a fourth related example, the UE may be configured with the RS type to be used for serving cell measurements as part of the MeasConfig, which may be one or a combination of the following alternatives:

Serving cell RS Type PCell (pCellRSType): There may be an IE defined in measConfig that indicates that the UE may perform PCell measurement results based on that RS Type. That may be in NR SS Block or CSI-RS. Based on the configured events linked to configured MOs, the UE may realize that the same RS type is used is all events requiring PCell measurements or, in the case that at least one event that may require PCell measurement results as trigger condition uses an RS Type different from the one provided in the measurement object, the UE may perform additional measurement results for the PCell based on that other RS Type.

Serving cell RS Type SCell (sCellRSType): There may be an IE defined in measConfig that indicates that the UE may perform all SCell measurement results based on that configured RS Type(s). That may be in NR SS Block or CSI-RS. Based on the configured events linked to MOs, the UE may realize that the same RS type is used is all events requiring SCell measurements or, in the case that at least one event that requires SCell measurement results as trigger condition uses an RS Type different from the one provided in the measurement object, the UE may perform additional measurement results for the SCell based on that other RS Type.

It may be noticed that although it has been mentioned that an RS Type is selected, that may be one RS Type, SS Block or CSI-RS, or both RS Type, e.g., SS Block AND CSI-RS.

When the UE may be measuring the serving cell, that is, PCell or SCell, based on the SS only and when the measurement report may be triggered, the sent measurement report may include the serving cell level quality based on SSBs only. The UE may also include the beam based results based on the SSBs for the cells included in the measurement report.

When the UE may be measuring the serving cell, that is, PCell or SCell, based on the CSI-RS only and when the measurement report may be triggered, the sent measurement report may include the serving cell level quality based on CSI-RSs only. The UE may also include the beam based results based on the CSI-RSs for the cells included in the measurement report.

When the UE may be measuring the serving cell, that is, PCell or SCell, based on both the SS and CSI-RS and when the measurement report may be triggered, the sent measurement report may include the serving cell level quality based on SSBs and the serving cell quality based on CSI-RSs. The UE may also include the beam based results based on the SSBs and CSI-RSs for the cells included in the measurement report.

An example format of the measResults structure components related to SCell is given below. It corresponds to the scenario when the UE reports whether the cell quality included for the SCell is based on SS or CSI-RS using the rsType parameter.

```
      ------     Begin MeasConfig information element   ------
-- ASN1START
MeasConfig ::=                  SEQUENCE {
   -- Measurement objects
   measObjectToRemoveList           MeasObjectToRemoveList
   OPTIONAL, -- Need ON
   measObjectToAddModList           MeasObjectToAddModList
   OPTIONAL, -- Need ON
   -- Reporting configurations
   reportConfigToRemoveList         ReportConfigToRemoveList
   OPTIONAL, -- Need ON
   reportConfigToAddModList         ReportConfigToAddModList
   OPTIONAL, -- Need ON
   -- Measurement identities
   measIdToRemoveList               MeasIdToRemoveList
   OPTIONAL, -- Need ON
   measIdToAddModList               MeasIdToAddModList
   OPTIONAL, -- Need ON
   -- Other parameters
   quantityConfig               QuantityConfig            OPTIONAL, --
Need ON
   measGapConfig                MeasGapConfig
   OPTIONAL, -- Need ON
   pCellRSType                  ENUMERATED{SS, CSI-RS, both}
   OPTIONAL, -- Need ON
   sCellRSType                  ENUMERATED{SS, CSI-RS, both}
   OPTIONAL, -- Need ON
   s-Measure                    RSRP-Range
                                    OPTIONAL,     -- Need ON
   preRegistrationInfoHRPD          PreRegistrationInfoHRPD
                                    OPTIONAL,     -- Need ON
      ------     End MeasConfig information element   ------
```

```
------ Begin measResults structure ------
MeasResultServFreqList ::=              SEQUENCE (SIZE (1..maxServCell)) OF
MeasResultServFreq
MeasResultServFreqListExt ::= SEQUENCE (SIZE (1..maxServCell)) OF
MeasResultServFreq
MeasResultServFreq ::=                  SEQUENCE {
    servFreqId                          ServCellIndex,
    measResultSCellList ::=             SEQUENCE (SIZE (1..maxServCell)) OF
measResultSCell
    measResultBestNeighCCellList ::= SEQUENCE (SIZE (1..maxServCell)) OF
measResultBestNeighCell
    measResultSCell                     SEQUENCE {
        rsrpResultSCell                 RSRP-Range,
        rsrqResultSCell                 RSRQ-Range,
        rs-sinr-Result                  RS-SINR-Range
        rsType                          ENUMERATED{SS,CSI-RS}
    }                                                   OPTIONAL,
    measResultBestNeighCell             SEQUENCE {
        physCellId                      PhysCellId,
        rsrpResultNCell                     RSRP-Range,
        rsrqResultNCell                     RSRQ-Range
        rs-sinr-Result                  RS-SINR-Range
        rsType                          ENUMERATED{SS,CSI-RS}
    }                                                   OPTIONAL,
    ...,
}
------ End measResults structure ------
```

Another example format of the measResults structure components related to SCell is given below. It corresponds to the scenario when the UE reports the cell quality included for the SCell is based on SS or CSI-RS using the rsType parameter and also informs the beam level information related to SCell is based on SS on CSI-RS.

```
------ Begin measResults structure ------
MeasResultServFreqList ::=              SEQUENCE (SIZE (1..maxServCell)) OF
MeasResultServFreq
MeasResultServFreqListExt ::= SEQUENCE (SIZE (1..maxServCell)) OF
MeasResultServFreq
MeasResultServFreq ::=                  SEQUENCE {
    servFreqId                          ServCellIndex,
    measResultSCellList ::=             SEQUENCE (SIZE (1..maxServCell)) OF
measResultSCell
    measResultBestNeighCCellList ::= SEQUENCE (SIZE (1..maxServCell)) OF
measResultBestNeighCell
        measResultSCell                 SEQUENCE {
            rsrpResultSCell             RSRP-Range,
            rsrqResultSCell             RSRQ-Range,
            rs-sinr-Result              RS-SINR-Range
            rsType                      ENUMERATED{SS,CSI-RS}
        }                                               OPTIONAL,
        measResultBestNeighCell         SEQUENCE {
            physCellId                  PhysCellId,
            rsrpResultNCell                 RSRP-Range,
            rsrqResultNCell                 RSRQ-Range
            rs-sinr-Result              RS-SINR-Range
            rsType                      ENUMERATED{SS,CSI-RSS}
        }
                                                        OPTIONAL,
    measResultBeamSCellList ::= SEQUENCE (SIZE (1..maxServCell)) OF
measResultBeamSCell
    measResultBeamBestNeighCCellList ::= SEQUENCE (SIZE (1..maxServCell)) OF
measResultBeamBestNeighCell
        measResultBeamSCell                 SEQUENCE {
            rsrpResultSCell             RSRP-Range,
            rsrqResultSCell             RSRQ-Range,
            rs-sinr-Result              RS-SINR-Range
            rsType                      ENUMERATED{SS,CSI-RS}
        }                                               OPTIONAL,
        measResultBeamBestNeighCell         SEQUENCE {
            physCellId                  PhysCellId,
            rsrpResultNCell                 RSRP-Range,
            rsrqResultNCell                 RSRQ-Range
```

```
        rs-sinr-Result                RS-SINR-Range
        rsType                        ENUMERATED{SS,CSI-RS}
    }                                                OPTIONAL,
    ...,
}
             ------  End measResults structure  ------
```

All the above mentioned examples hold true if the PCell or SCell is replaced with PSCell.

Further Extensions and Variations

Embodiments related to the telecommunications system 180 will now be described.

A method performed by the telecommunications system 180 may comprise one or more of the following actions.

Figure 7:
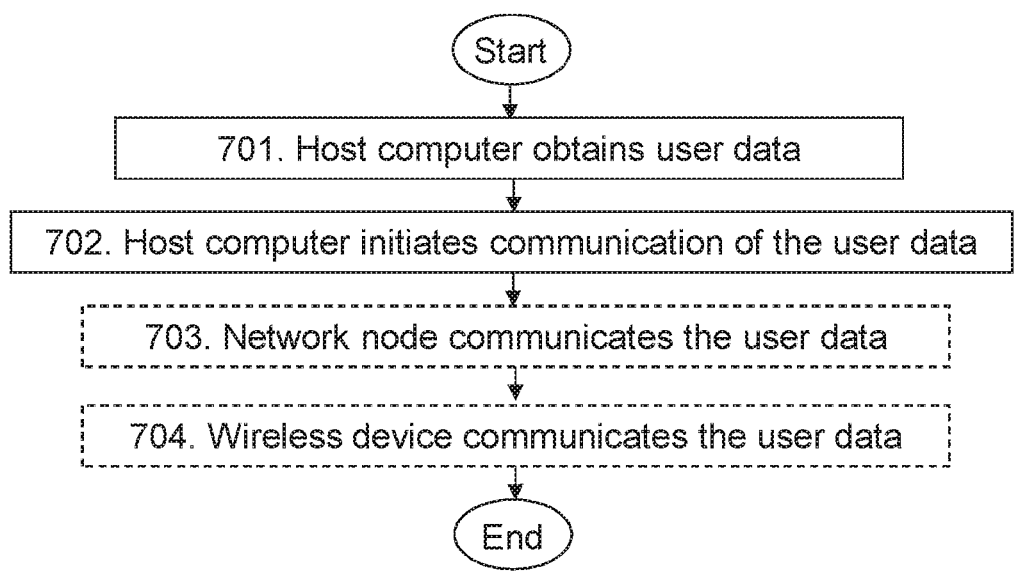
FIG. 7 is a flowchart depicting a method in a telecommunications system, according to embodiments herein.

In some embodiments all the actions may be performed. In some embodiments, one or more actions may be performed. One or more embodiments may be combined, where applicable. Particularly, it may be understood that any of the Actions, features or embodiments described thus far may be combined with the actions of the method in the communications system 180 described below. All possible combinations are not described to simplify the description. In FIG. 7, optional actions are indicated with dashed lines. Some actions may be performed in a different order than that shown in FIG. 7. For example, since communication may be any of reception of transmission, the actions may be performed in the opposite order than that depicted in FIG. 7.

Action 701

In this Action 701, the communications system 180 may obtain, at the host computer 150, user data for a user of the wireless device 130.

Action 702

In this Action 702, the communications system 180 may initiate communication, at the host computer 150, of the user data to or from the wireless device 130.

Action 703

In this Action 703, the communications system 180 may communicate, at the network node 110, the user data between the host computer 150 and the wireless device 130. The network node 110 may further perform the Action 301 of providing the first indication to the wireless device 130, the first indication comprising the configuration, per configured event, of one or more events, wherein each of the one or more events sets a condition to trigger a measurement report, wherein at least one of the one or more events is configured in at least one reportConfig, linked to a measurement object whose Reference Signal, RS, Type within the reportConfig is set to one type of signal of the one or more types of signals to perform measurements on. The network node 110 may further perform the Action 302 of obtaining, based on the provided first indication, the second indication from the wireless device 130. The second indication may be based on the measurements by the wireless device 130, on the at least the one type of signal that is set within the reportConfig.

Action 704

In this Action 704, the communications system 180 may communicate, at the wireless device 130, the user data to or from the host computer 150. The wireless device 130 may further perform the Action 202 of determining the one or more types of signals to perform measurements on, for each of the cells in the set of cells, the determination being based on the obtained configuration, per configured event, of the one or more events, wherein each of the one or more events sets a condition to trigger a measurement report, wherein at least one of the one or more events is configured in at least one reportConfig linked to a measurement object whose Reference Signal, RS, Type within the reportConfig is set to one type of signal of the one or more types of signals, and wherein the wireless device 130 determines to perform the measurements on at least the one type of signal that is set.

The wireless device 130 may further perform the Action 203 of initiating sending the indication to the network node 110, serving the wireless device 130, the indication being based on the measurements by the wireless device 130 on the determined one or more types.

The wireless device 130 may further perform the Action 201 of obtaining a first indication from the network node 110, the first indication comprising the configuration.

Communicating may mean herein any of receiving or transmitting. Similarly, communication may be transmission or reception. It may be understood that if the host computer 150 initiates communication, wherein communication is transmission, the communicating 703 at the network node 110 may comprise receiving from the host computer 150 and transmitting to the wireless device 130, and the communicating 704 at the wireless device 130 may comprise receiving. Likewise, it may be understood that if the host computer 150 initiates communication, wherein communication is reception, the communicating 703 at the network node 110 may comprise receiving from the wireless device 130 and transmitting to the host computer 150, and the communicating 704 at the wireless device 130 may comprise transmitting.

To perform the method actions described above in relation to FIG. 7, the communications system 180 may be configured to handle the broadcast information. The telecommunications system 180 may comprise the host computer 150, and at least one of the network node 110, and the wireless device 130.

The communications system 180 may be configured to obtain, at the host computer 150, the user data for a user of the wireless device 130. The communications system 180 may be further configured to initiate communication, at the host computer 150, of the user data to or from the wireless device 130.

Figure 8:
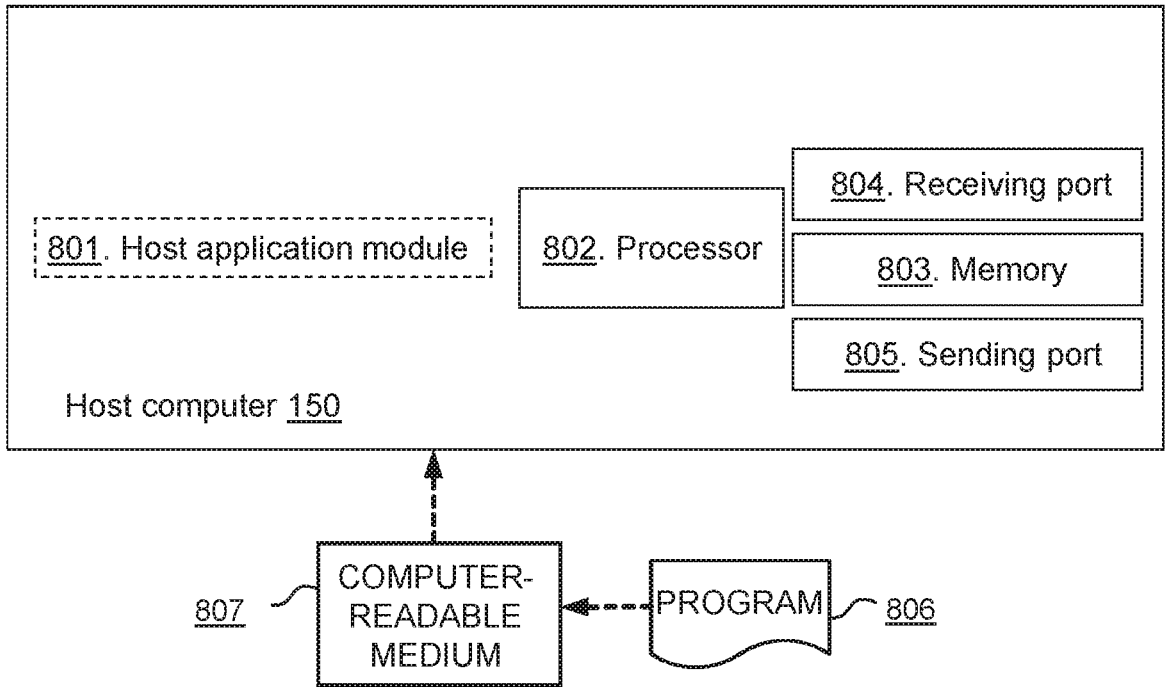
FIG. 8 is a schematic block diagram illustrating two non-limiting examples, a) and b), of a host computer, according to embodiments herein.
Figure 8:
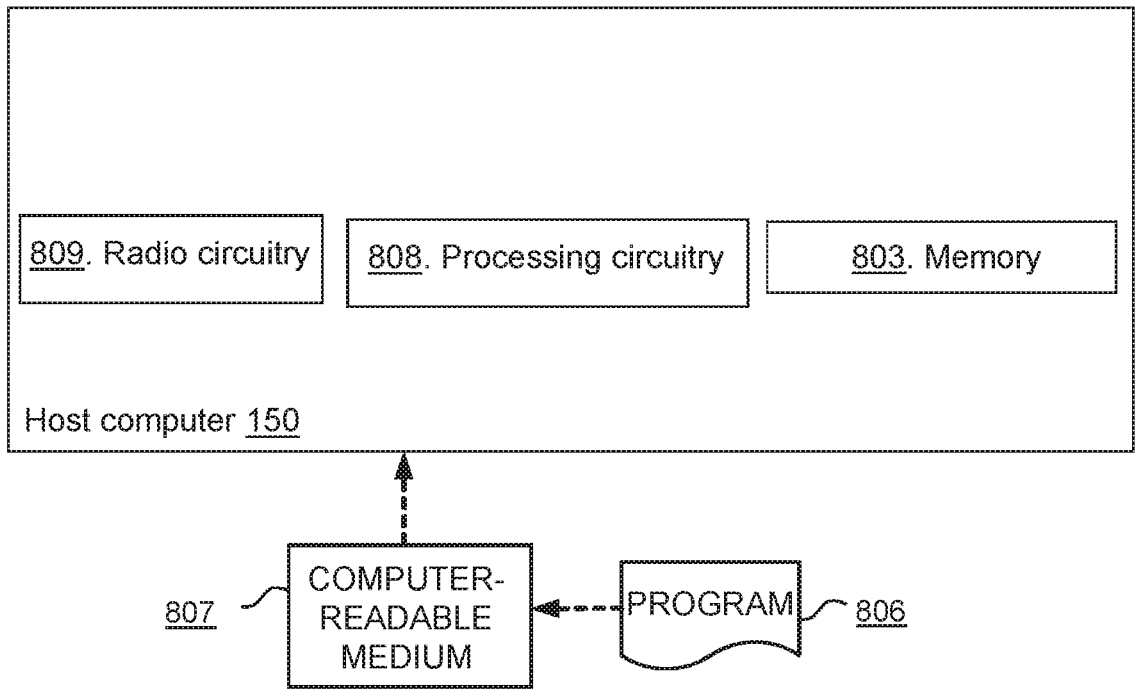

FIG. 8 depicts two different examples in panels a) and b), respectively, of the arrangement that the host computer 150 may comprise to perform the method actions described above in relation to FIG. 7.

The detailed description of some of the following corresponds to the same references provided above, in relation to the actions described for the network node 110, and the wireless device 130, and will thus not be repeated here. In some embodiments, the host computer 150 may comprise the following arrangement depicted in FIG. 8a.

The host computer 150 may be configured to perform the obtaining of Action 701, e.g. by means of a host application module 801 within the host computer 150, configured to, obtain, at the host computer 150, the user data for a user of the wireless device 130. The host application module 801 may be a processor 802 of the host computer 150, or an application running on such processor.

The host computer 150 may be configured to perform the initiating of Action 702, e.g. by means of the host application module 801 within the host computer 150, configured to, initiate communication, at the host computer 150, of the user data to or from the wireless device 130. The host application module 801 may be the processor 802 of the host computer 150, or an application running on such processor.

The embodiments herein in the host computer 150 may be implemented through one or more processors, such as a processor 802 in the host computer 150 depicted in FIG. 8a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the in the host computer 150. One such carrier may be in the form of a CD ROM disc. It is however feasible with other data carriers such as a memory stick. The computer program code may furthermore be provided as pure program code on a server and downloaded to the host computer 150.

The host computer 150 may further comprise a memory 803 comprising one or more memory units. The memory 803 is arranged to be used to store obtained information, store data, configurations, schedulings, and applications etc. to perform the methods herein when being executed in the host computer 150.

In some embodiments, the host computer 150 may receive information from, e.g., any of the network node 110 and the wireless device 130, through a receiving port 804. In some embodiments, the receiving port 804 may be, for example, connected to one or more antennas in host computer 150. In other embodiments, the host computer 150 may receive information from another structure in the telecommunications system 180, e.g., in the wireless communications network 100, through the receiving port 804. Since the receiving port 804 may be in communication with the processor 802, the receiving port 804 may then send the received information to the processor 802. The receiving port 804 may also be configured to receive other information.

The processor 802 in the host computer 150 may be further configured to transmit or send information to e.g., any of the network node 110, the wireless device 130, and/or another structure in the telecommunications system 180, e.g., in the wireless communications network 100, through a sending port 805, which may be in communication with the processor 802, and the memory 803.

Those skilled in the art will also appreciate that the host application module 801 described above may refer to a combination of analog and digital modules, and/or one or more processors configured with software and/or firmware, e.g., stored in memory, that, when executed by the one or more processors such as the processor 802, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the host application module 801 described above may be implemented as one or more applications running on one or more processors such as the processor 802.

Thus, the methods according to the embodiments described herein for the host computer 150 may be respectively implemented by means of a computer program 806 product, comprising instructions, i.e., software code portions, which, when executed on at least one processor 802, cause the at least one processor 802 to carry out the actions described herein, as performed by the host computer 150. The computer program 806 product may be stored on a computer-readable storage medium 807. The computer-readable storage medium 807, having stored thereon the computer program 806, may comprise instructions which, when executed on at least one processor 802, cause the at least one processor 802 to carry out the actions described herein, as performed by the host computer 150. In some embodiments, the computer-readable storage medium 807 may be a non-transitory computer-readable storage medium, such as a CD ROM disc, or a memory stick. In other embodiments, the computer program 806 product may be stored on a carrier containing the computer program 806 just described, wherein the carrier is one of an electronic signal, optical signal, radio signal, or the computer-readable storage medium 807, as described above.

The host computer 150 may comprise an interface unit or a communication interface configured to facilitate communications between the host computer 150 and other nodes or devices, e.g., any of the network node 110 and the wireless device 130, or any of the other nodes in the wireless communications network 100. The interface may, for example, include a transceiver configured to transmit and receive radio signals over an air interface in accordance with a suitable standard.

In other embodiments, the host computer 150 may comprise the following arrangement depicted in FIG. 8b. The host computer 150 may comprise a processing circuitry 808, e.g., one or more processors such as the processor 802, in the host computer 150 and the memory 803. The host computer 150 may also comprise a radio circuitry 809, which may comprise e.g., the receiving port 804 and the sending port 805. The processing circuitry 809 may be configured to perform the method actions according to FIG. 7, in a similar manner as that described in relation to FIG. 8a. The radio circuitry 809 may be configured to set up and maintain at least a wireless connection with any of the network node 110 and the wireless device 130. Circuitry may be understood herein as a hardware component.

Hence, embodiments herein also relate to the host computer 150 operative to handle cell selection and/or reselection by the host computer 150, the host computer 150 being operative to operate in the wireless communications network 100. The host computer 150 may comprise the processing circuitry 808 and the memory 803, said memory 803 containing instructions executable by said processing circuitry 808, whereby the host computer 150 is further operative to perform the actions described herein in relation to the host computer 150, e.g., in FIG. 7.

Example implementations, in accordance with an embodiment, of the wireless device 130, and host computer 150 discussed in the preceding paragraphs will now be described with reference to FIG. 9. According to this example implementation, in the telecommunications system 180, the host computer 150 comprises HardWare (HW) 901 including a communication interface 902 configured to set up and maintain a wired or wireless connection with an interface of a different communication device of the telecommunications system 180. The communication interface 902 may comprise the receiving port 804 and the sending port 805, as described above. The host computer 150 further comprises the processing circuitry 808, which may have storage and/or processing capabilities. In particular, the processing circuitry 808 may comprise one or more programmable processors, application-specific integrated circuits, field programmable gate arrays or combinations of these, not shown, adapted to execute instructions. The embodiments herein as performed by the host computer 150 may be implemented through one or more processors, such as the processing circuitry 808 in the host computer 150 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the in the host computer 150. One such carrier may be in the form of a CD ROM disc. It is however feasible with other data carriers such as a memory stick. The computer program code may furthermore be provided as pure program code on a server and downloaded to the host computer 150.

The hardware 901 of the host computer 150 may further comprise the memory 803, which is not depicted in FIG. 9 to simplify the Figure.

The host computer 150 may further comprise a SoftWare (SW) 903, which is stored in or accessible by the host computer 150 and executable by the processing circuitry 808. The software 903 may include a host application 904. The host application 904 may be operable to provide a service to a remote user, such as the wireless device 130, connecting via the third link 160, e.g., an OTT connection, terminating at the wireless device 130 and the host computer 150. In providing the service to the remote user, the host application 904 may provide user data which is communicated using the third link 160, e.g., the OTT connection. The host application 904 may be understood to be configured to or operative to perform any of the actions described earlier as performed by the host application module 801.

The processing circuit 808 may be configured to provide the user data for a user of the wireless device 130. In some embodiments, the processing circuitry 808 of the host computer 150 may be configured to execute the host application 904, thereby providing the user data.

The processing circuitry 808 may be further configured to initiate the communication carrying the user data to the wireless device 130.

The communication interface 902 may be configured to communicate the user data to the wireless communications network 100 comprising the wireless device 130.

Those skilled in the art will also appreciate that the host application 904 described above, in some other examples, may refer to a combination of analog and digital modules, and/or one or more processors configured with software and/or firmware, e.g., stored in memory, that, when executed by the one or more processors such as the processing circuitry 608, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the host application 904 described above may be implemented as one or more applications running on one or more processors such as the processing circuitry 808.

The telecommunication system 180 may further include the wireless device 130, which may comprise the following example arrangement depicted in FIG. 9. The wireless device may comprise a hardware 905 which may include a radio interface 906 configured to set up and maintain any of the first link 141 and the second link 142, with the network node 110, serving a coverage area in which the wireless device 130 is currently located, as a part of the third link 160. The hardware 905 of the wireless device 130 further includes the processing circuitry 512, which may comprise one or more programmable processors, application-specific integrated circuits, field programmable gate arrays or combinations of these (not shown) adapted to execute instructions. The wireless device 130 may further comprise software 907, which is stored in or accessible by the wireless device 130 and executable by the processing circuitry 512. The software 907 may include a client application 908. The client application 908 may be operable to provide a service to a human or non-human user via the wireless device 130, with the support of the host computer 150. In the host computer 150, the executing host application 904 may communicate with the executing client application 908 via the third link 160, e.g., an OTT connection, terminating at the wireless device 130, and the host computer 150. In providing the service to the user, the client application 908 may receive request data from the host application 904 and provide user data in response to the request data. The third link 160 may transfer both the request data and the user data. The client application 908 may interact with the user to generate the user data that it provides. The client application 908 may be understood to be configured to or operative to perform any of the actions described earlier as performed by the client application module 505.

The communications system 180 may be further configured to at least one of:

a) communicate, at the network node 110, the user data between the host computer 150 and the wireless device 130, wherein the network node 110 is further configured to: provide the first indication to the wireless device 130. The first indication is configured to comprise the configuration, per configured event, of the one or more events. Each of the one or more events is configured to set a condition to trigger a measurement report. At least one of the one or more events is configured in at least one reportConfig, configured to be linked to the measurement object whose RS Type within the reportConfig is configured to be set to one type of signal of one or more types of signals to perform measurements on; the network node 110 may be further configured to obtain, based on the first indication configured to be provided, the second indication from the wireless device 130, the second indication being configured to be based on the measurements, by the wireless device 130, on the at least the one type of signal that is configured to be set within the reportConfig; and b) communicate, at the wireless device 130, the user data to or from the host computer 150, wherein the wireless device 130 is further configured to: determine the one or more types of signals to perform measurements on for each cell in the set of cells. To determine is configured to be based on the configuration configured to be obtained, per configured event, of the one or more events, wherein each of the one or more events is configured to set a condition to trigger a measurement report. At least one of the one or more events is configured in at least one reportConfig configured to be linked to a measurement object whose Reference Signal (RS) Type within the reportConfig is configured to be set to one type of signal of the one or more types of signals. The wireless device 130 is configured to determine to perform the measurements on at least the one type of signal that is configured to be set; the wireless device 130 may be further configured to initiate sending the indication to the network node 110 configured to serve the wireless device 130. The indication is configured to be based on the measurements by the wireless device 130 on the one or more types of signals configured to be determined.

The wireless device 130 may be configured to perform the communicating of Action 704, e.g. by means of the client application module 505 within the wireless device 130, configured to perform this action.

The wireless device 130 may be configured to perform the other actions as described before. The wireless device 130 may also be configured to perform any of the actions described in relation to FIG. 2, as described before.

The inner workings of the wireless device 130, and the host computer 150 may be as shown in FIG. 9, or as in any of FIG. 5 and FIG. 8, respectively, and independently, the surrounding network topology may be that of FIG. 1.

The telecommunication system 180 may further include the network node 110, which may comprise the following example arrangement depicted in FIG. 9. The network node 110 comprises a hardware 909 which may include a radio interface 910 configured to set up and maintain the first link 141, e.g., a wireless connection, with the wireless device 130, serving a coverage area in which the wireless device 130 is currently located, as a part of the third link 160. The hardware 909 of the network node 110 further includes the processing circuitry 610, which may comprise one or more programmable processors, application-specific integrated circuits, field programmable gate arrays or combinations of these (not shown) adapted to execute instructions. The hardware 909 of the network node 110 may further include a communication interface 911, which may be configured to facilitate a connection to the host computer 150, e.g., as part of the third link 160. The network node 110 may further comprise software 912, which is stored in or accessible by the network node 110 and executable by the processing circuitry 610.

The network node 110 may be configured to perform the communicating of Action 703, e.g. by means of the other modules 603 within the network node 110, configured to perform this action. The network node 110 may be configured to perform the other actions as described before.

Figure 3:
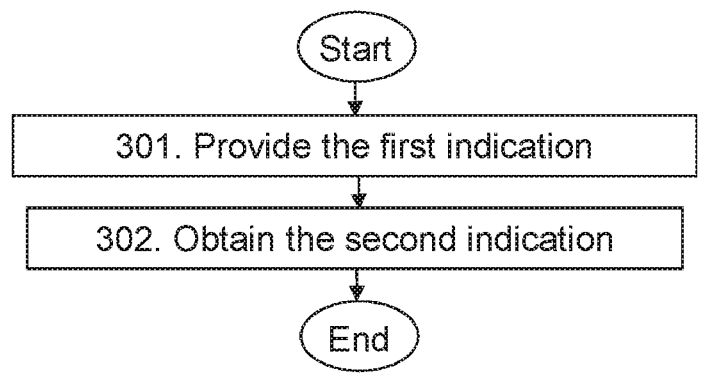
FIG. 3 is a flowchart depicting a method in a network node, according to embodiments herein.

The network node 110 may also be configured to perform any of the actions described in relation to FIG. 3, as described before.

The inner workings of the network node 110, and the host computer 150 may be as shown in FIG. 9, or as in any of FIG. 6 and FIG. 8, respectively, and independently, the surrounding network topology may be that of FIG. 1.

In FIG. 9, the third link 160, which is in this FIG. 9 an OTT connection, has been drawn schematically to illustrate the communication between the host computer 150 and the wireless device 130, which may be e.g., via the network node 110, without explicit reference to any intermediary devices and the precise routing of messages via these devices. Network infrastructure may determine the routing, which it may be configured to hide from the wireless device 130 or from the service provider operating the host computer 150, or both. While the OTT connection is active, the network infrastructure may further take decisions by which it dynamically changes the routing, e.g., on the basis of load balancing consideration or reconfiguration of the network.

The third link 160 between the wireless device 130, and the host computer 150, and/or the network node 110, as the case may be, is in accordance with the teachings of the embodiments described throughout this disclosure. One or more of the various embodiments improve the performance of OTT services provided to the wireless device 130 using the OTT connection of the third link 160, in which the wireless connection of the first link 141 may form the last segment.

It may be understood that the wireless device 130 in the telecommunications system 180 may comprise any of the arrangements described in FIG. 5 or 9. Similarly, the network node 110 in the telecommunications system 180 may comprise any of the arrangements described in FIG. 6 or 9. Similarly, the host computer 150 in the telecommunications system 180 may comprise any of the arrangements described in FIG. 8 or 9.

Embodiments herein may relate to NR mobility, beam recovery and beam management.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method, performed by a wireless device, for handling measurements by the wireless device on a set of cells comprising at least a first cell, the cells in the set being serving cells, the wireless device operating in a wireless communications network, the method comprising:

determining one or more types of signals to perform measurements on for each cell in the set of cells, said determining being based on an obtained configuration, per configured event, of one or more events, wherein each of the one or more events sets a condition to trigger a measurement report, wherein said determining comprises determining to perform measurements on each of at least one type of signal of a plurality of types of signal in response to determining that at least one of the one or more events is configured in at least one reportConfig linked to a measurement object whose Reference Signal (RS) Type within the reportConfig is set to the respective one type of signal of the one or more types of signals, and initiating sending an indication to a network node serving the wireless device, the indication being based on the measurements by the wireless device on the determined one or more types of signals.

2. A method, performed by a network node, for handling measurements by a wireless device on a set of cells comprising at least a first cell, the cells in the set being serving cells, the network node and the wireless device operating in a wireless communications network, the method comprising:

providing a first indication to the wireless device, the first indication comprising a configuration, per configured event, of one or more events, wherein each of the one or more events sets a condition to trigger a measurement report, wherein at least one of the one or more events is configured in at least one reportConfig, linked to a measurement object whose Reference Signal (RS) Type within the reportConfig is set to one type of signal of a plurality of types of signals to perform measurements on, wherein the plurality of types of signals comprises an RS in a synchronization signal (SS) Block and a CSI-RS(s), and obtaining, based on the provided first indication, a second indication from the wireless device, the second indication being based on the measurements, by the wireless device, on the at least the one type of signal that is set within the reportConfig.

3. A wireless device configured to handle measurements by the wireless device on a set of cells configured to comprise at least a first cell, the cells in the set being configured to be serving cells, the wireless device being configured to operate in a wireless communications network, wherein the wireless device comprises:

radio circuitry configured for communication with cells in the wireless communications network;

processing circuitry operatively coupled to the radio circuitry; and memory operatively coupled to the processing circuitry and comprising program code for execution by the processing circuitry whereby the processing circuitry is configured to:

determine one or more types of signals to perform measurements on for each cell in the set of cells, based on an obtained configuration, per configured event, of one or more events, wherein each of the one or more events sets a condition to trigger a measurement report, wherein said determining comprises determining to perform measurements on each of at least one type of signal of a plurality of types of signal in response to determining that at least one of the one or more events is configured in at least one reportConfig linked to a measurement object whose Reference Signal (RS) Type within the reportConfig is set to the respective one type of signal of the one or more types of signals, and initiate sending an indication to a network node configured to serve the wireless device, the indication being based on the measurements by the wireless device on the one or more types of signals configured to be determined.

4. The wireless device of claim 3, wherein the indication comprises cell level information, based on the one or more types of signals configured to be determined.

5. The wireless device of claim 3, wherein the indication comprises beam level information, based on the one or more types of signals configured to be determined.

6. The wireless device of claim 3, wherein the obtained configuration is the reportConfig.

7. The wireless device of claim 3, wherein the indication is a second indication, the processing circuitry being further configured to:

obtain a first indication from the network node, the first indication being configured to comprise the configuration.

8. The wireless device of claim 3, wherein the one or more types of signals comprise: an RS in a synchronization signal (SS) Block, or a CSI-RS(s).

9. The wireless device of claim 3, wherein one of:

a. the at least one of the one or more events is A1, wherein the event A1 is configured to be linked to the measurement object configured to be associated to the first cell; and b. the at least one of the one or more events is A2, wherein the event A2 is configured to be linked to the measurement object configured to be associated to the first cell.

10. The wireless device of claim 9, wherein the at least one of the one or more events is one of A1 and A2, and wherein at least one of the following applies:

c. the measurement object is configured to be associated to the first cell, and is configured to be linked to the at least one reportConfig, whose RS Type is configured to be set to SS, and the processing circuitry is further configured to perform first cell measurements based on the SS; and d. the measurement object is configured to be associated to the first cell, and is configured to be linked to the at least one reportConfig, whose RS Type is configured to be set to CSI-RS, and the processing circuitry is further configured to perform first cell measurements based on the CSI-RS.

11. The wireless device of claim 3, wherein the at least one of the one or more events is A3, and wherein at least one of the following applies:

a. the A3 event is configured in the at least one reportConfig configured to be linked to the measurement object, whose RS Type is configured to be set to SS, and the processing circuitry is further configured to perform first cell measurements at least based on the SS; and b. the A3 event is configured in the at least one reportConfig configured to be linked to a measurement object, whose RS Type is configured to be set to CSI-RS, and the processing circuitry is further configured to perform first cell measurements at least based on the CSI-RS.

12. The wireless device of claim 3, wherein the at least one of the one or more events is A4, and wherein at least one of the following applies:

a. the A4 event is configured in the at least one reportConfig configured to be linked to the measurement object, whose RS Type is configured to be set to SS, and the processing circuitry is further configured to perform first cell measurements based on the SS;

b. the A4 event is configured in the at least one reportConfig configured to be linked to the measurement object, whose RS Type is configured to be set to CSI-RS, and the processing circuitry is further configured to perform first cell measurements based on the CSI-RS;

c. the A4 event is configured in the at least one reportConfig configured to be linked to the measurement object, whose RS Type is configured to be set to CSI-RS, wherein the CSI-RS is not configured for the wireless device, and the processing circuitry is further configured to perform first cell measurements based on SS; and d. the A4 event is configured in the at least one reportConfig configured to be linked to the measurement object, whose RS Type is configured to be set to CSI-RS, wherein the CSI-RS is not configured for the first cell, and the processing circuitry is further configured to notify the network of a failure related to cell level measurements of the first cell.

13. The wireless device of claim 3, wherein the at least one of the one or more events is A5, and wherein at least one of the following applies:

a. the A5 event is configured in the at least one reportConfig configured to be linked to the measurement object whose RS Type is configured to be set to SS, and the processing circuitry is further configured to perform first cell measurements based on the SS;

b. the A5 event is configured in the at least one reportConfig configured to be linked to a measurement object, whose RS Type is configured to be set to CSI-RS, and the processing circuitry is further configured to perform first cell measurements based on the CSI-RS.

14. The wireless device of claim 3, wherein the set of cells is further configured to further comprise one or more second cells.

15. The wireless device of claim 14, wherein the first cell is configured to be a primary cell (PCell) and the one or more second cells are configured to be secondary cells (SCell).

16. The wireless device of claim 14, wherein the at least one of the one or more events is A6, and wherein at least one of the following applies:
    a. the A6 event is configured in the at least one reportConfig configured to be linked to the measurement object, whose RS Type is configured to be set to SS, and the processing circuitry is further configured to perform one or more second cells measurements based on the SS at least for the one or more second cells configured to be associated to the frequency associated to the measurement object configured to be linked to the configured one or more second cells;
    b. the A6 event is configured in the at least one reportConfig configured to be linked to a measurement object whose RS Type is configured to be set to CSI-RS, and the processing circuitry is further configured to perform one or more second cells measurements based on the CSI-RS at least for the one or more second cells configured to be associated to the frequency associated to the measurement object configured to be linked to the configured one or more second cells.

17. The wireless device of claim 3, wherein the indication is further configured to be based on which event of the at least one of the one or more events is configured, and what RS Type is configured.

18. A network node configured to handle measurements by a wireless device on a set of cells configured to comprise at least a first cell, the cells in the set being configured to be serving cells, the network node and the wireless device being configured to operate in a wireless communications network, the network node comprising:
    radio circuitry configured for communication with the wireless device;
    processing circuitry operatively coupled to the radio circuitry; and
    memory operatively coupled to the processing circuitry and comprising program code for execution by the processing circuitry whereby the processing circuitry is configured to:
        provide a first indication to the wireless device, the first indication being configured to comprise a configuration, per configured event, of one or more events, wherein each of the one or more events is configured to set a condition to trigger a measurement report, wherein at least one of the one or more events is configured in at least one reportConfig, configured to be linked to a measurement object whose Reference Signal (RS) Type within the reportConfig is configured to be set to one type of signal of a plurality of types of signals to perform measurements on, wherein the plurality of types of signals comprises an RS in a synchronization signal (SS) Block and a CSI-RS(s), and
        obtain, based on the first indication configured to be provided, a second indication from the wireless device, the second indication being configured to be based on the measurements, by the wireless device, on the at least the one type of signal that is configured to be set within the reportConfig.

19. The network node of claim 18, wherein the second indication comprises cell level information, based on the first indication configured to be provided.

20. The network node of claim 18, wherein the second indication comprises beam level information, based on the first indication configured to be provided.

21. The network node of claim 18, wherein one of:
    a. the at least one of the one or more events is A1, wherein the event A1 is configured and is configured to be linked to the measurement object configured to be associated to the first cell; and
    b. the at least one of the one or more events is A2, wherein the event A2 is configured and is configured to be linked to the measurement object configured to be associated to the first cell.

22. The network node of claim 21, wherein the at least one of the one or more events is one of A1 and A2, and wherein at least one of the following applies:
    c. the measurement object is configured to be associated to the first cell, and is configured to be linked to the at least one reportConfig, whose RS Type is configured to be set to SS, and the second indication is configured to be based on first cell measurements configured to be performed by the wireless device based on the SS; and
    d. the measurement object is configured to be associated to the first cell, and is configured to be linked to the at least one reportConfig, whose RS Type is configured to be set to CSI-RS, and the second indication is configured to be based on first cell measurements configured to be performed by the wireless device based on the CSI-RS.

23. The network node of claim 18, wherein the at least one of the one or more events is A3, and wherein at least one of the following applies:
    a. the A3 event is configured in the at least one reportConfig configured to be linked to the measurement object, whose RS Type is configured to be set to SS, and the second indication is configured to be based on first cell measurements configured to be performed by the wireless device at least based on the SS; and
    b. the A3 event is configured in the at least one reportConfig configured to be linked to a measurement object, whose RS Type is configured to be set to CSI-RS, and the second indication is configured to be based on first cell measurements configured to be performed by the wireless device at least based on the CSI-RS.

24. The network node of claim 18, wherein the at least one of the one or more events is A4, and wherein at least one of the following applies:
    a. the A4 event is configured in the at least one reportConfig configured to be linked to the measurement object, whose RS Type is configured to be set to SS, and the second indication is configured to be based on first cell measurements configured to be performed by the wireless device based on the SS;
    b. the A4 event is configured in the at least one reportConfig configured to be linked to the measurement object, whose RS Type is configured to be set to CSI-RS, and the second indication is configured to be based on first cell measurements configured to be performed by the wireless device based on the CSI-RS;
    c. the A4 event is configured in the at least one reportConfig configured to be linked to the measurement object, whose RS Type is configured to be set to CSI-RS, wherein the CSI-RS is not configured for the wireless device, and the second indication is configured to be based on first cell measurements configured to be performed by the wireless device based on SS; and d. the A4 event is configured in the at least one reportConfig configured to be linked to the measurement object, whose RS Type is configured to be set to CSI-RS, wherein the CSI-RS is not configured for the first cell, and the network node is configured to receive a notification from the wireless device, wherein the notification is configured to notify of a failure related to cell level measurements of the first cell.

25. The network node of claim 18, wherein the at least one of the one or more events is A5, and wherein at least one of the following applies:
    a. the A5 event is configured in the at least one reportConfig configured to be linked to the measurement object whose RS Type is configured to be set to SS, and the second indication is configured to be based on first cell measurements configured to be performed by the wireless device based on the SS;
    b. the A5 event is configured in the at least one reportConfig configured to be linked to a measurement object, whose RS Type is configured to be set to CSI-RS, and the second indication is configured to be based on first cell measurements configured to be performed by the wireless device based on the CSI-RS.

26. The network node of claim 18, wherein the set of cells is further configured to comprise one or more second cells, wherein the at least one of the one or more events is A6, and wherein at least one of the following applies:
    a. the A6 event is configured in the at least one reportConfig configured to be linked to the measurement object, whose RS Type is configured to be set to SS, and the second indication is configured to be based on measurements configured to be performed by the wireless device on one or more second cells based on the SS at least for the one or more second cells configured to be associated to the frequency associated to the measurement object configured to be linked to the configured one or more second cells;
    b. the A6 event is configured in the at least one reportConfig configured to be linked to a measurement object whose RS Type is configured to be set to CSI-RS, and the second indication is configured to be based on measurements configured to be performed by the wireless device on one or more second cells configured to be based on the CSI-RS at least for the one or more second cells configured to be associated to the frequency configured to be associated to the measurement object configured to be linked to the configured one or more second cells.

27. The network node of claim 18, wherein the second indication is further configured to be based on which event of the at least one of the one or more events is configured, and what RS Type is configured.

* * * * *